United States Patent
Zhu et al.

(10) Patent No.: US 11,206,690 B2
(45) Date of Patent: Dec. 21, 2021

(54) ONE-WAY DELAY (OWD) MEASUREMENTS IN NEXT-GENERATION MULTI-ACCESS NETWORKS

(71) Applicant: Intel Corporation, Santa Clara, CA (US)

(72) Inventors: Jing Zhu, Portland, OR (US); Pengfei Zhao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 16/610,875

(22) PCT Filed: Jun. 25, 2018

(86) PCT No.: PCT/US2018/039366
§ 371 (c)(1),
(2) Date: Nov. 4, 2019

(87) PCT Pub. No.: WO2019/005703
PCT Pub. Date: Jan. 3, 2019

(65) Prior Publication Data
US 2021/0153254 A1    May 20, 2021

Related U.S. Application Data

(60) Provisional application No. 62/525,067, filed on Jun. 26, 2017.

(51) Int. Cl.
*H04W 4/00* (2018.01)
*H04W 74/08* (2009.01)
*H04B 17/364* (2015.01)
*H04W 76/11* (2018.01)
*H04L 5/00* (2006.01)
*H04L 12/26* (2006.01)
*H04W 24/08* (2009.01)

(52) U.S. Cl.
CPC ...... *H04W 74/0833* (2013.01); *H04B 17/364* (2015.01); *H04L 5/0055* (2013.01); *H04L 43/0864* (2013.01); *H04W 24/08* (2013.01); *H04W 76/11* (2018.02)

(58) Field of Classification Search
CPC   H04W 74/0833; H04W 76/11; H04B 17/364; H04L 5/0055
See application file for complete search history.

(56) References Cited

U.S. PATENT DOCUMENTS

| | | | |
|---|---|---|---|
| 8,009,638 B2 | 8/2011 | Chin et al. | |
| 2005/0226240 A1* | 10/2005 | Hoffmann | H04L 67/02 370/389 |
| 2011/0110230 A1 | 5/2011 | Zhuang | |

(Continued)

OTHER PUBLICATIONS

S. Kanugovi et al., Control Plane Protocols and Procedures for Multiple Access Management Services, Mar. 27, 2017, INTAREA (Year: 2017).*

(Continued)

*Primary Examiner* — Siren Wei
(74) *Attorney, Agent, or Firm* — Schwabe, Williamson & Wyatt, P.C.

(57) ABSTRACT

Systems, methods, and computer-readable storage media for measuring one-way delay in multi-access networks (MAMS) are provided. Other embodiments may be described and/or claimed.

23 Claims, 18 Drawing Sheets

(56) References Cited

U.S. PATENT DOCUMENTS

2011/0269478 A1* 11/2011 Das ................... H04L 43/0864
455/456.1
2015/0365312 A1* 12/2015 Pasuparthy ............ H04L 43/10
709/224
2016/0119250 A1   4/2016 Girard

OTHER PUBLICATIONS

S. Kanugovi et al., Multiple Access Management Services, Mar. 27, 2017, INTAREA (Year: 2017).*
International Search Report and Written Opinion dated Oct. 2, 2018 for International Patent Application No. PCT/US2018/039366, 15 pages.
Mats Rosbach, "Verification of Network Simulator: The good, the bad and the ugly", Nov. 21, 2012, 117 pages.
S. Kanugovi et al., "Control Plane Protocols and Procedures for Multiple Access Management Services", Mar. 27, 2017, 19 pages.

* cited by examiner

610

| Message Type | CID | Sequence Number | Probe Flag | Padding |

| Message Type | CID | R-CID | Sequence Number | Probe Flag | Padding |

| IP header | IP Payload | MX trailer |

Figure 6D

ONE-WAY DELAY (OWD) MEASUREMENTS IN NEXT-GENERATION MULTI-ACCESS NETWORKS

CROSS REFERENCE TO RELATED APPLICATIONS

The present application is a national phase entry under 35 U.S.C. § 371 of International Application No. PCT/US2018/039366, filed Jun. 25, 2018, entitled "ONE-WAY DELAY (OWD) MEASUREMENTS IN NEXT-GENERATION MULTI-ACCESS NETWORKS", which claims priority to U.S. Provisional Application No. 62/525,067 filed Jun. 26, 2017, which designated, among the various States, the United States of America. The Specifications of the PCT/US2018/039366 and 62/525,067 Applications are hereby incorporated by reference.

TECHNICAL FIELD

The present disclosure relates to the field of wireless communication devices. More particularly, the present disclosure relates to systems, apparatuses, methods, and computer-readable media for measuring one-way delay (OWD) for wireless communication devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Multi Access Management Services (MAMS) is a programmable framework that provides mechanisms for flexible selection of network paths in a multi-access communication environment, based on application needs, which may leverage network intelligence and policies to dynamically adapt to changing network/link conditions. The MAMS framework may offer the capabilities of smart selection and flexible combination of access paths and core network paths.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 6B and 6C illustrate examples of MAMS probe request (Probe-REQ) message formats in accordance with various embodiments.

FIG. 6D illustrates an example of a MAMS data packet format in accordance with various embodiments.

DETAILED DESCRIPTION

Figure 1:
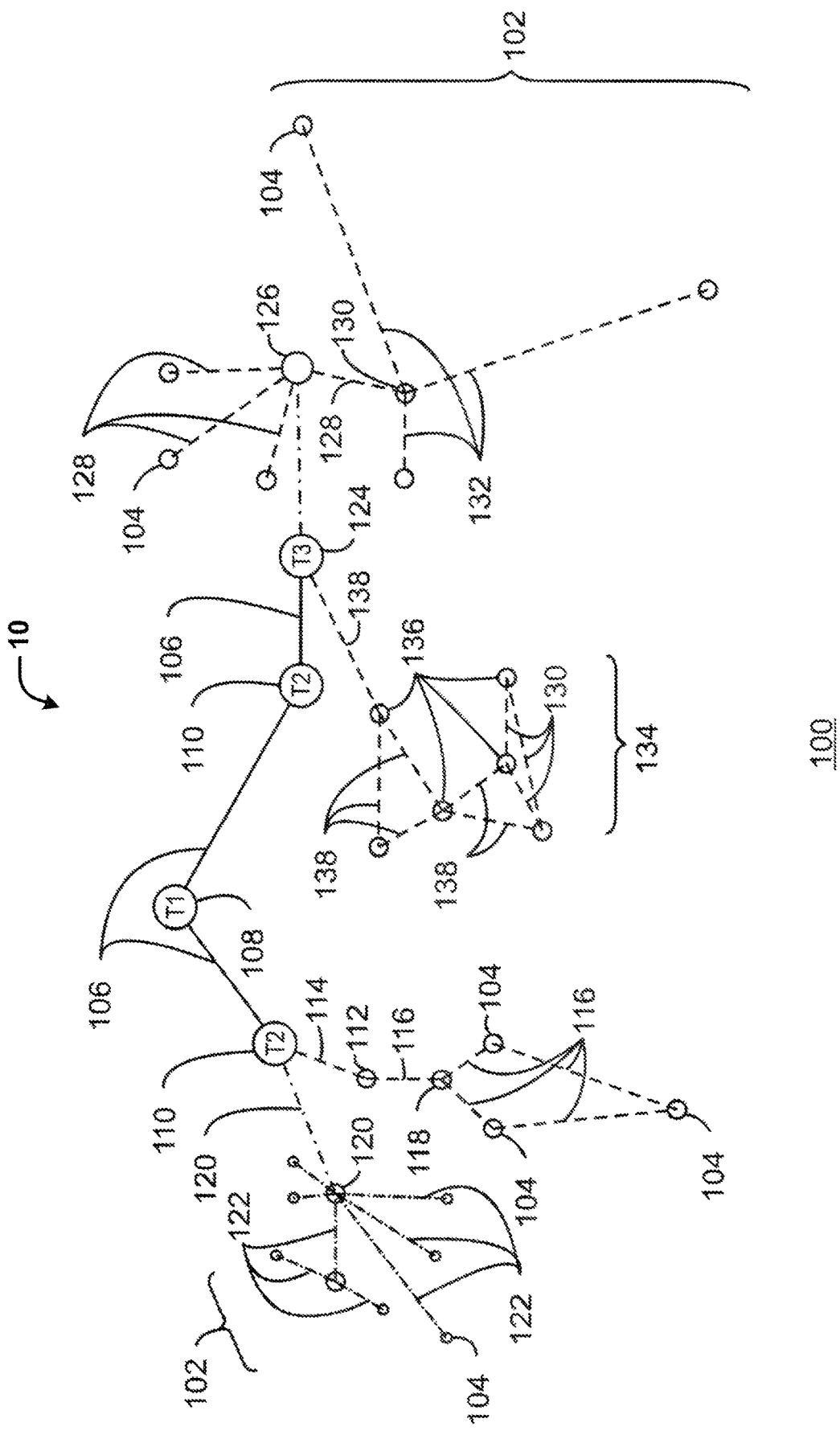
FIG. 1 illustrates an arrangement showing interconnections that may be present between a network and Internet of Things (IoT) networks, in accordance with various embodiments.

Among other things, embodiments of the present disclosure are related to providing enhancements for measuring one-way delay (OWD) for access links and network paths. OWD measurements may be used, for example, to help separately estimate link quality for uplink and downlink, and to dynamically balance traffic loads across multiple network paths.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous. The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. System Examples

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 2:
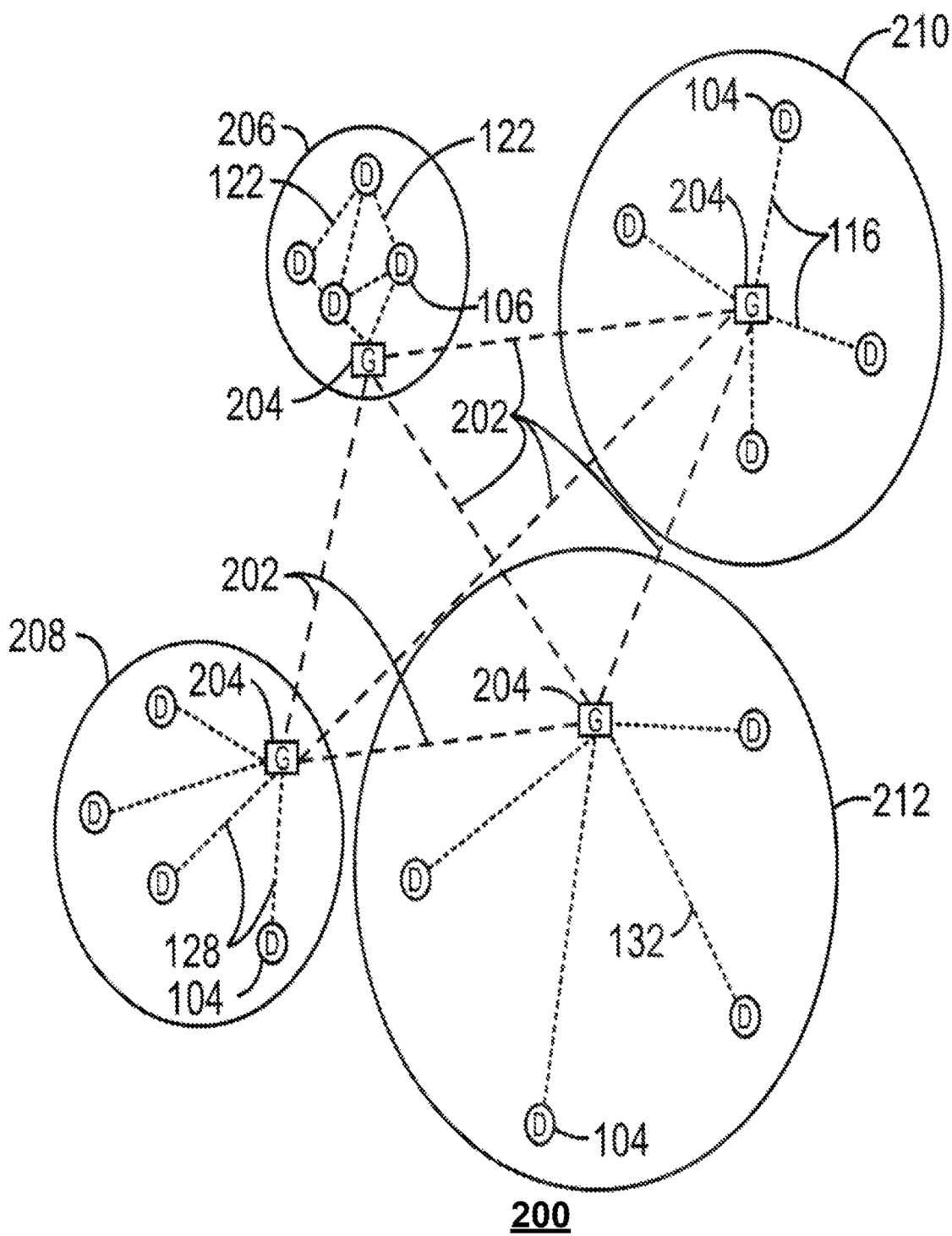
FIG. 2 illustrates an example of a domain topology in accordance with various embodiments.

FIG. 1 illustrates an arrangement 100 showing interconnections that may be present between the Internet 100 and IoT networks, in accordance with various embodiments. The interconnections may couple smaller networks 102, down to the individual IoT device 104, to the fiber backbone 106 of the Internet 100. To simplify the drawing, not every device 104, or other object, is labeled.

In FIG. 1, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE or NR communication links 116. In another example, a high-speed uplink 120 may couple a tier 2 provider 110 to a gateway (GW) 120. A number of IoT devices 104 may communicate with the GW 120, and with each other through the GW 120, for example, over BLE links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate GW 126 and other customers. From the corporate GW 126, a wireless local area network (WLAN) can be used to communicate with IoT devices 104 through Wi-Fi® links 128. A Wi-Fi link 128 may also be used to couple to a low power wide area (LPWA) GW 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

IoT devices 104 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 104 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 104 may be biotic devices such as monitoring implants, biosensors, biochips, and the like. In other embodiments, an IoT device 104 may be a computer device that is embedded in a computer system and coupled with communications circuitry of the computer system. In such embodiments, the IoT device 104 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 104 may include one or more memory devices and one or more processors to capture and store/record data. Each of the IoT devices 104 may include appropriate communications circuitry (e.g., transceiver(s), modem, antenna elements, etc.) to communicate (e.g., transmit and receive) captured and stored/recorded data. Further, each IoT device 104 may include other transceivers for communications using additional protocols and frequencies. The wireless communications protocols may be any suitable set of standardized rules or instructions implemented by the IoT devices 104 to communicate with other devices, including instructions for packetizing/depacketizing data, instructions for modulating/demodulating signals, instructions for implementation of protocols stacks, and the like. For example, IoT devices 104 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 112, GW 120, 126, and 130, coordinator device 136, and so forth, may also be incorporated with the embodiments described herein, in particular, with references to FIGS. 5A-13.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 2 illustrates an example of a domain topology 200 that may be used for a number of IoT networks coupled through backbone links 202 to GWs 204, in accordance with various embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet. Similar to FIG. 1, in embodiments, one or more of IoT devices 104, GW 204, and so forth, may be incorporated with embodiments described herein.

The network topology 200 may include any number of types of IoT networks, such as a mesh network 206 using BLE links 122. Other IoT networks that may be present include a WLAN network 208, a cellular network 210, and an LPWA network 212. Each of these IoT networks may provide opportunities for new developments, as described herein. For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources. Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
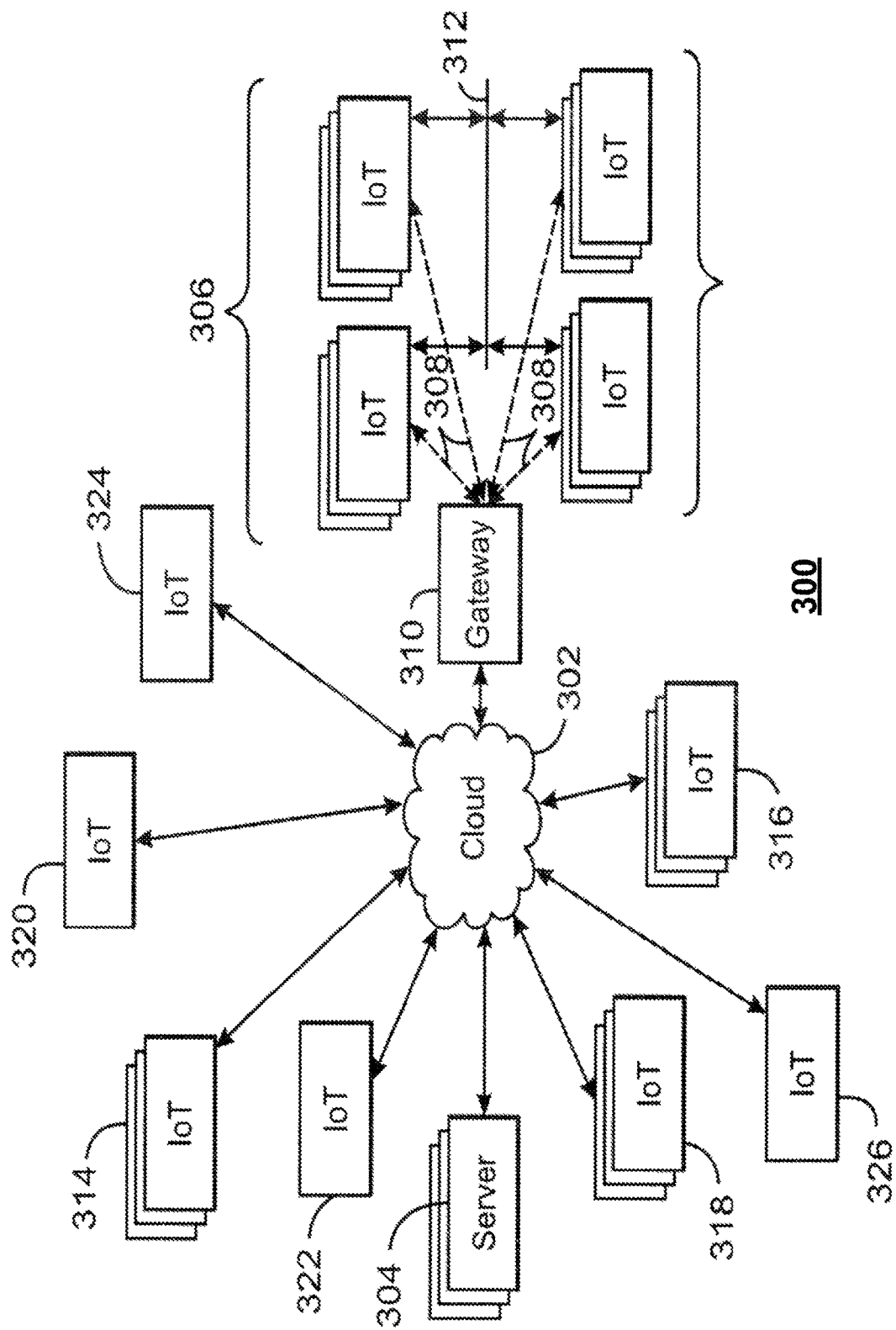
FIG. 3 illustrates an example of a cloud computing network or cloud in communication with a number of IoT devices, in accordance with various embodiments.

FIG. 3 illustrates an example of an arrangement 300F of a cloud computing network, or cloud 302, in communication with a number of Internet of Things (IoT) devices, in accordance with various embodiments. The cloud 302 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 302 may be associated with network operator who owns or controls equipment and other elements necessary to provide network-related services, such as one or more base stations or access points, and one or more servers for routing digital data or telephone calls (for example, a core network or backbone network).

The IoT devices in FIG. 3 may be the same or similar to the IoT devices 104 discussed with regard to FIGS. 1-2. The IoT devices may include any number of different types of devices, grouped in various combinations, such as IoT group 306 that may include IoT devices that provide one or more services for a particular user, customer, organizations, etc. A service provider may deploy the IoT devices in the IoT group 306 to a particular area (e.g., a geolocation, building, etc.) in order to provide the one or more services. In one example, the IoT group 306 may be a traffic control group where the IoT devices in the IoT group 306 may include stoplights, traffic flow monitors, cameras, weather sensors, and the like, to provide traffic control and traffic analytics services for a particular municipality or other like entity. Similar to FIGS. 1-2, in embodiments, one or more of IoT devices 314-324, GW 310, and so forth, may be incorporated with the various embodiments described herein, in particular, with references to FIGS. 5A-13. For example, in some embodiments, the IoT group 306, or any of the IoT groups discussed herein, may include the components, devices, systems discussed with regard to FIGS. 7-9.

The IoT group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a GW 310 to communicate with the cloud 302. Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the IoT group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

In another example, the IoT group 306 may be an industrial control group (also referred to as a "connected factory", an "industry 4.0" group, and the like) where the IoT devices in the IoT group 306 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 306 may communicate with the servers 304 via GW 310 and cloud 302 to provide captured data, which may be used to provide performance monitoring and analytics to the manufacturer or factory operator. Additionally, the IoT devices in the IoT group 306 may communicate among each other, and/or with other IoT devices of other IoT groups, to make decisions on their own and to perform their tasks as autonomously as possible.

Clusters of IoT devices, such as the IoT groups depicted by FIG. 3, may be equipped to communicate with other IoT devices as well as with the cloud 302. This may allow the IoT devices to form an ad-hoc network between the devices, allowing them to function as a single device, which may be termed a fog device. This is discussed further with respect to FIG. 4.

Figure 4:
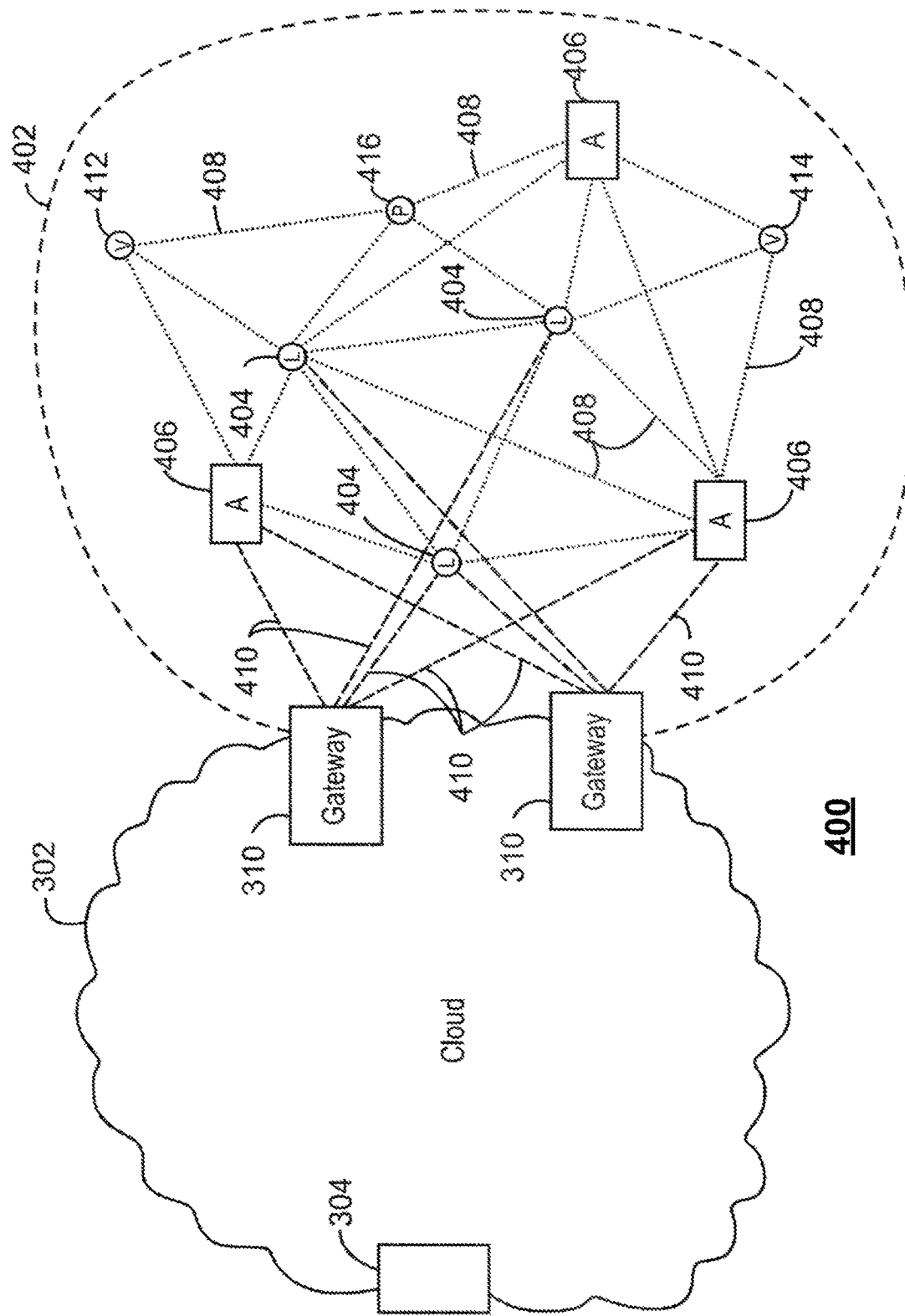
FIG. 4 illustrates an arrangement of a cloud computing network or cloud in communication with a mesh network of IoT devices or IoT fog, in accordance with various embodiments.

FIG. 4 illustrates an arrangement 400 of a cloud computing network, or cloud 302, in communication with a mesh network of IoT devices, which may be termed a fog device 402, operating at the edge of the cloud 302, in accordance with various embodiments. Like numbered items are as described with respect to FIGS. 1-3. In this example, the fog device 402 is a group of IoT devices at an intersection. The fog device 402 may be established in accordance with specifications released by the OpenFog Consortium (OFC), the Open Connectivity Foundation™ (OCF), among others.

Data may be captured, stored/recorded, and communicated among the IoT devices 404. Analysis of the traffic flow and control schemes may be implemented by aggregators 406 that are in communication with the IoT devices 404 and each other through a mesh network. Data may be uploaded to the cloud 302, and commands received from the cloud 302, through GWs 310 that are in communication with the IoT devices 404 and the aggregators 406 through the mesh network. Similar to FIGS. 1-3, in embodiments, one or more of IoT devices 404, aggregators 406, and so forth, may be incorporated with the various embodiments described herein, in particular, with references to FIGS. 6A-6F and 10-13. For example, in some embodiments, the fog device 402, or any of grouping of devices discussed herein, may include one or more components, devices systems, etc. discussed infra with regard to FIGS. 6A-6F and 10-13.

Any number of communications links may be used in the fog device 402. Shorter-range links 408, for example, compatible with IEEE 802.15.4 may provide local communications between IoT devices that are proximate to one another or other devices. Longer-range links 410F, for example, compatible with LPWA standards, may provide communications between the IoT devices and the GWs 310. To simplify the diagram, not every communications link 408 or 410F is labeled with a reference number.

The fog device 402 may be considered to be a massively interconnected network wherein a number of IoT devices are in communications with each other, for example, by the communication links 408 and 410F. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 310. In these networks, the number of interconnections may provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first mobile device 412, a second mobile device 414, and a third mobile device 416. The fog device 402 may be presented to clients in the cloud 302, such as the server 304, as a single device located at the edge of the cloud 302. In this example, the control communications to specific resources in the fog device 402 may occur without identifying any specific IoT device 404 within the fog device 402. Accordingly, if any IoT device 404 fails, other IoT devices 404 may be able to discover and control a resource. For example, the IoT devices 404 may be wired so as to allow any one of the IoT devices 404 to control measurements, inputs, outputs, etc., for the other IoT devices 404. The aggregators 406 may also provide redundancy in the control of the IoT devices 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the devices 412, 414, 416, join the fog device 402. As transient or mobile IoT devices enter or leave the fog 402, the fog device 402 may reconfigure itself to include those devices. This may be performed by forming a temporary group of the devices 412 and 414 and the third mobile device 416 to control or otherwise communicate with the IoT devices 404. If one or both of the devices 412, 414 are autonomous, the temporary group may provide instructions to the devices 412, 414. As the transient devices 412, 414, and 416, leave the vicinity of the fog device 402, it may reconfigure itself to eliminate those IoT devices from the network. The fog device 402 may also divide itself into functional units, such as the IoT devices 404 and other IoT devices proximate to a particular area or geographic feature, or other IoT devices that perform a particular function. This type of combination may enable the formation of larger IoT constructs using resources from the fog device 402.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 5A:
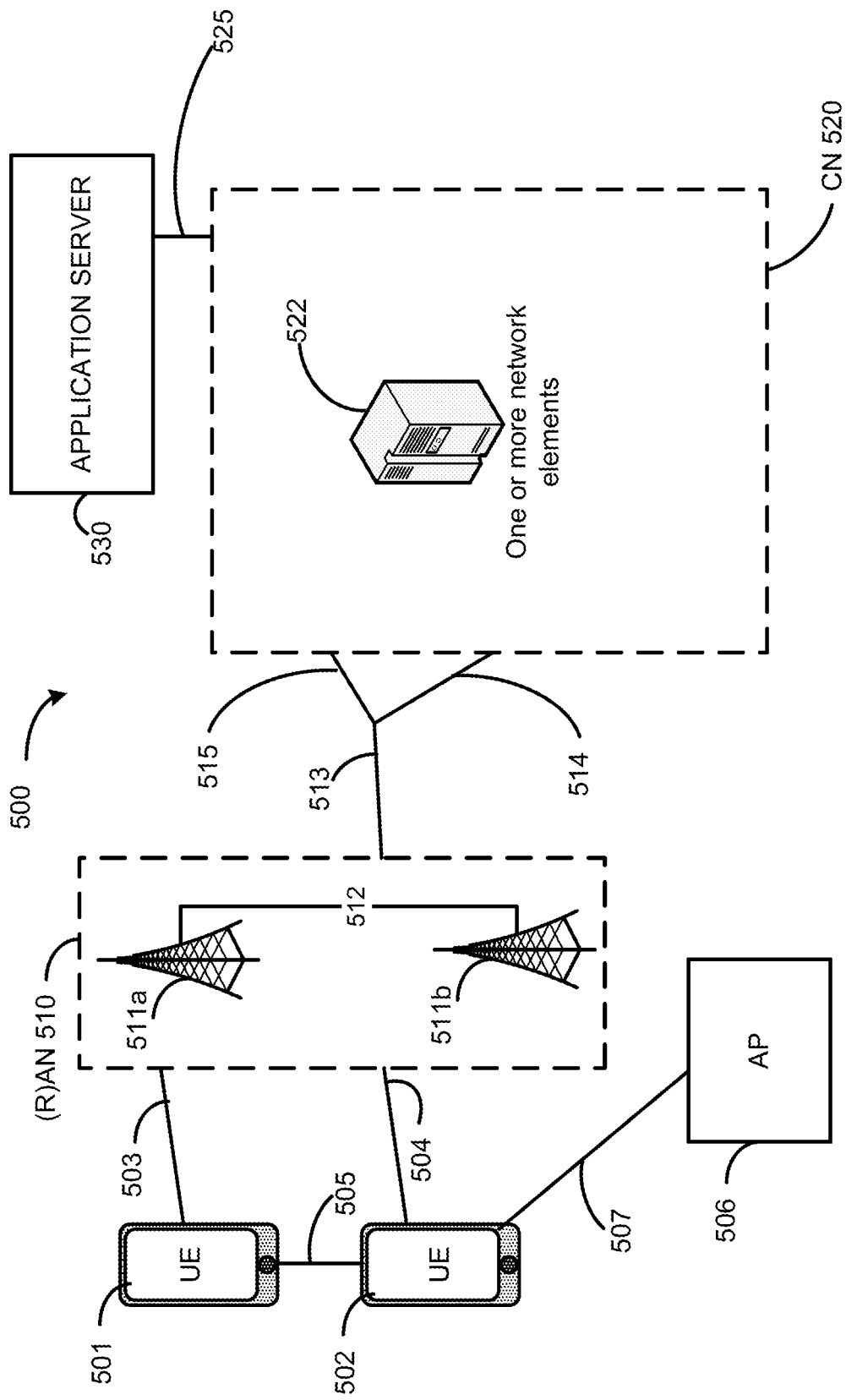
FIG. 5A illustrates an example of an architecture of a network in accordance with various embodiments.

FIG. 5A illustrates an example of an architecture of a network in accordance with various embodiments. The following description is provided for an example of a system 500 that operates in conjunction with the as Long Term Evolution (LTE) system standards and the Fifth Generation (5G) or New Radio (NR) system standards as provided by 3rd Generation Partnership Project (3GPP) technical specifications (TS). However, examples of embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 5A, the system 500 may include user equipment (UE) 501a and UE 501b (collectively referred to as "UEs 501" or "UE 501"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/ engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with a access network (AN) or radio access network (RAN) 510. In embodiments, the RAN 510 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 501 may directly exchange communication data via a ProSe interface 505. The ProSe interface 505 may alternatively be referred to as a sidelink (SL) interface 505 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 501b is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 501b, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 501b in RRC_CONNECTED being configured by a RAN node 511 to utilize radio resources of LTE and WLAN. LWIP operation may involve the UE 501b using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell).

The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." An RSU is a computing device coupled with radiofrequency circuitry located on a roadside that provides connectivity support to passing vehicle UEs 501. The RSU may also include internal data storage circuitry to store intersection map geometry, traffic statistics, media, as well as applications/software to sense and control on-going vehicular and pedestrian traffic. The RSU may operate on the 5.9 GHz Direct Short Range Communications (DSRC) band to provide very low latency communications required for high speed events, such as crash avoidance, traffic warnings, and the like. In addition, the RSU may operate as a WiFi hotspot (2.4 GHz band) and/or provide connectivity to one or more cellular networks to provide uplink and downlink communications. The computing device and some or all of the radiofrequency circuitry of the RSU may be packaged in a weatherproof enclosure suitable for outdoor installation, and may include a network interface controller to provide a wired (e.g., Ethernet) connection to a traffic signal controller requiring and/or a backhaul network As used herein, the term "NG RAN node" or the like may refer to a RAN node 511 that operates in an NR or 5G system 500 (for example a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 511 may be implemented as one or more software entities running on server computers as part of a virtual network, which may be referred to as a cloud radio access network (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other Layer 2 (L2) protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications, such as Multi-access Edge Computing (MEC) and other data center applications. In addition, the virtualized framework reduces energy consumption and increases hardware utilization of the computation units. In other embodiments, the RAN nodes 511 may represent individual gNB-distributed units (DUs) that are connected to a gNB-centralized unit (CU) via an F1 interface (not shown by FIG. 5A).

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using Orthogonal Frequency-Division Multiplexing (OFDM) communication signals with each other or with any of the RAN nodes 511 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501, 502 and the RAN nodes 511, 512 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501, 502 and the RAN nodes 511, 512 may operate using Licensed Assisted Access (LAA), enhanced LAA (eLAA), and/or further eLAA (feLAA) mechanisms. In these implementations, the UEs 501, 502 and the RAN nodes 511, 512 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501, 502, RAN nodes 511, 512, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 501 or 502, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 501, 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 501. The physical downlink control channel (PDCCH) may carry information about the transport format and resource allocations related to the PDSCH channel, among other things. It may also inform the UEs 501 about the transport format, resource allocation, and H-ARQ (Hybrid Automatic Repeat Request) information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, Core Network (CN) 520. The CN 520 may comprise a plurality of network elements 522, which are configured to offer various data and telecommunications services to customers/subscribers (e.g., users of UEs 501) who are connected to the CN 520 via the RAN 510. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS Packet Services (PS) domain, LTE PS data services, etc.). The application server 530 can also be configured to support one or more communication services (e.g., Voice-over-Internet Protocol (VoIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling interface between the RAN nodes 511 and Access and Mobility Functions (AMFs). Embodiments where the CN 520 is a 5GC 520 are discussed in more detail with regard to FIG. 5C.

In embodiments, the CN 520 may be a 5G CN (referred to as "5GC 520" or the like), while in other embodiments, the CN 520 may be an Evolved Packet Core (EPC)). Where CN 520 is an EPC (referred to as "EPC 520" or the like), the RAN 510 may be connected with the CN 520 via an S1 interface 513. In embodiments, the S1 interface 53 may be split into two parts, an S1 user plane (S1-U) interface 514, which carries traffic data between the RAN nodes 511 and the serving gateway (S-GW), and the S1-mobility management entity (MME) interface 515, which is a signaling interface between the RAN nodes 511 and MMEs. An example architecture wherein the CN 520 is an EPC 520 is shown by FIG. 5B.

Figure 5B:
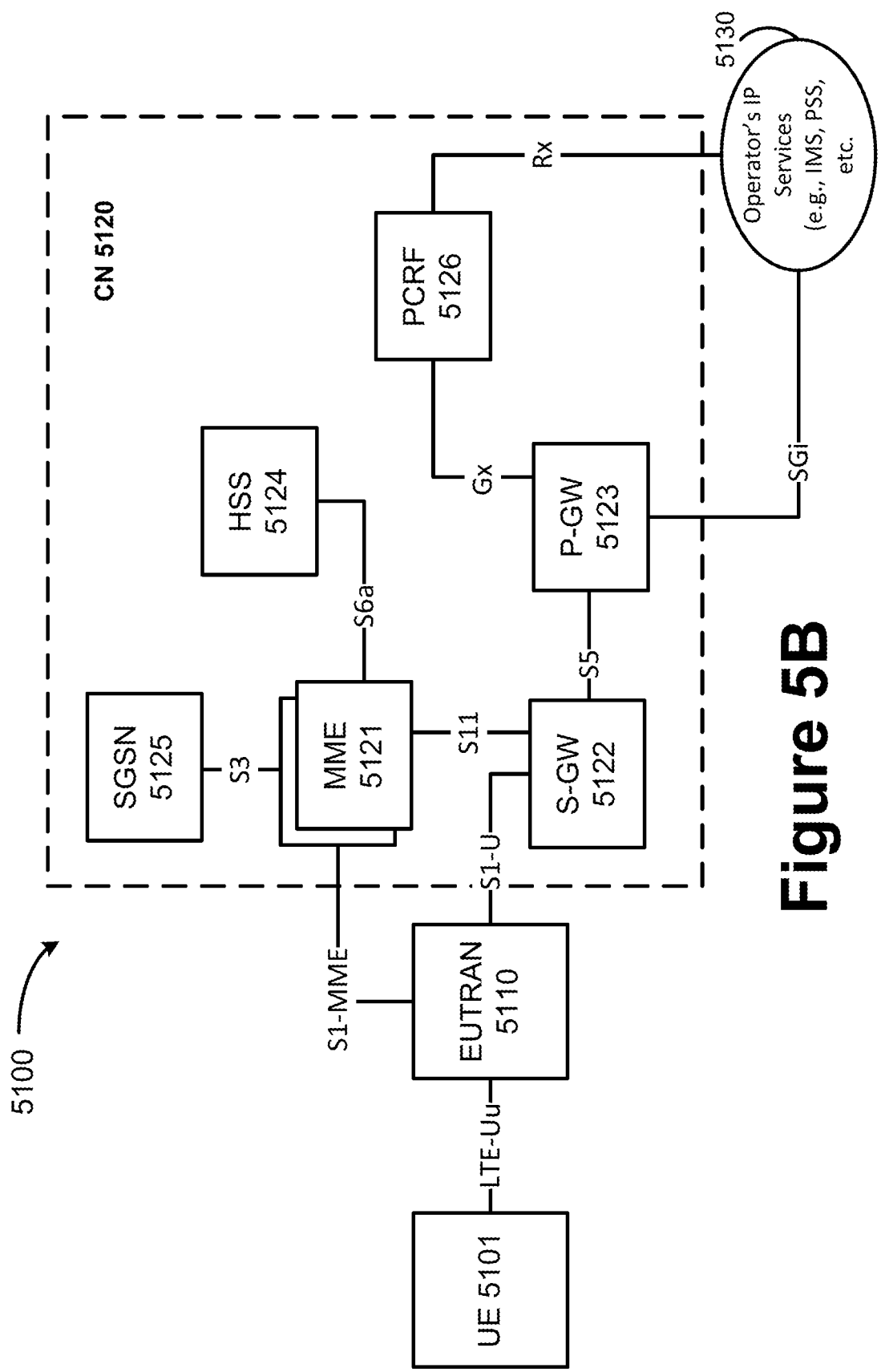
FIG. 5B illustrates an example of an architecture of a system including a first core network in accordance with various embodiments.

FIG. 5B illustrates an example architecture of a system 5100 including a first CN 5120 is shown, in accordance with various embodiments. In this example, system 5100 may implement the LTE standard wherein the CN 5120 is an EPC 5120 that corresponds with CN 520 of FIG. 5A. Additionally, the UE 5101 may be the same or similar as the UEs 501 of FIG. 5A, and the EUTRAN 5110 may be a RAN that is the same or similar to the RAN 510 of FIG. 5A, and which may include RAN nodes 511 discussed previously. The CN 5120 may comprise MMEs 5121, an S-GW 5122, a Packet Data Network (PDN) Gateway (P-GW) 5123, a home subscriber server (HSS) 5124, and a Serving General Packet Radio Service (GPRS) Support Nodes (SGSN) 5125.

The MMEs 5121 may be similar in function to the control plane of legacy SGSN, and may implement mobility management (MM) functions to keep track of the current location of a UE 5101. The MMEs 5121 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 5101, provide user identity confidentiality, and/or other like services to users/subscribers. Each UE 5101 and the MME 5121 may include an MM or EMM sublayer, and an MM context may be established in the UE 5101 and the MME 5121 when an attach procedure is successfully completed. The MM context may be a data structure or database object that stores MM-related information of the UE 5101. The MMEs 5121 may be coupled with the HSS 5124 via an S6a reference point, coupled with the SGSN 5125 via an S3 reference point, and coupled with the S-GW 5122 via an S11 reference point.

The SGSN 5125 may be a node that serves the UE 5101 by tracking the location of an individual UE 5101 and performing security functions. In addition, the SGSN 5125 may perform Inter-EPC node signaling for mobility between 2G/3G and E-UTRAN 3GPP access networks; PDN and S-GW selection as specified by the MMEs 5121; handling of UE 5101 time zone functions as specified by the MMEs 5121; and MME selection for handovers to E-UTRAN 3GPP access network. The S3 reference point between the MMEs 5121 and the SGSN 5125 may enable user and bearer information exchange for inter-3GPP access network mobility in idle and/or active states.

The HSS 5124 may comprise a database for network users, including subscription-related information to support the network entities' handling of communication sessions. The EPC 5120 may comprise one or several HSSs 5124, depending on the number of mobile subscribers, on the capacity of the equipment, on the organization of the network, etc. For example, the HSS 5124 can provide support for routing/roaming, authentication, authorization, naming/addressing resolution, location dependencies, etc. An S6a reference point between the HHS 5124 and the MMEs 5121 may enable transfer of subscription and authentication data for authenticating/authorizing user access to the EPC 5120 between HHS 5124 and the MMEs 5121.

The S-GW 5122 may terminate the S1 interface 513 ("S1-U" in FIG. 5B) towards the RAN 5110, and routes data packets between the RAN 5110 and the EPC 5120. In addition, the S-GW 5122 may be a local mobility anchor point for inter-RAN node handovers and also may provide an anchor for inter-3GPP mobility. Other responsibilities may include lawful intercept, charging, and some policy enforcement. The S11 reference point between the S-GW 5122 and the MMEs 5121 may provide a control plane between the MMEs 5121 and the S-GW 5122. The S-GW 5122 may be coupled with the P-GW 5123 via an S5 reference point.

The P-GW 5123 may terminate an SGi interface toward a Packet Data Network (PDN) 5130. The P-GW 5123 may route data packets between the EPC 5120 and external networks such as a network including the application server 530 (alternatively referred to as application function (AF)) via an Internet Protocol (IP) interface 525 (see e.g., FIG. 5A). In embodiments, the P-GW 5123 may be communicatively coupled to an application server (application server 530 of FIG. 5A or PDN 5130 in FIG. 5B) via an IP communications interface 525 (see e.g., FIG. 5A). The S5 reference point between the P-GW 5123 and the S-GW 5122 may provide user plane tunneling and tunnel management between the P-GW 5123 and the S-GW 5122. The S5 reference point may also be used for S-GW 5122 relocation due to UE 5101 mobility and if the S-GW 5122 needs to connect to a non-collocated P-GW 5123 for the required PDN connectivity. The P-GW 5123 may further include a node for policy enforcement and charging data collection (e.g., Policy and Charging Enforcement Function (PCEF) (not shown). Additionally, the SGi reference point between the P-GW 5123 and the packet data network (PDN) 5130 may be an operator external public, a private PDN, or an intra operator packet data network, for example, for provision of IMS services. The P-GW 5123 may be coupled with a PCRF 5126 via a Gx reference point.

Policy and Charging Enforcement Function (PCRF) 5126 is the policy and charging control element of the EPC 5120. In a non-roaming scenario, there may be a single PCRF 5126 in the Home Public Land Mobile Network (HPLMN) associated with an UE's 5101 Internet Protocol Connectivity Access Network (IP-CAN) session. In a roaming scenario with local breakout of traffic, there may be two PCRFs associated with an UE's 5101 IP-CAN session, a Home PCRF (H-PCRF) within a HPLMN and a Visited PCRF (V-PCRF) within a Visited Public Land Mobile Network (VPLMN). The PCRF may be communicatively coupled to the application server 5130 via the P-GW 5123. The application server 5130 may signal the PCRF to indicate a new service flow and select the appropriate Quality of Service (QoS) and charging parameters. The PCRF 5126 may provision this rule into a Policy and Charging Enforcement Function (PCEF) (not shown) with the appropriate traffic flow template (TFT) and QoS class of identifier (QCI), which commences the QoS and charging as specified by the application server 5130. The Gx reference point between the PCRF 5126 and the P-GW 5123 may allow for the transfer of (QoS) policy and charging rules from the PCRF 5126 to Policy and Charging Enforcement Function (PCEF) in the P-GW 5123. An Rx reference point may reside between the PDN 5130 (or "AF 5130") and the PCRF 5126.

Figure 5C:
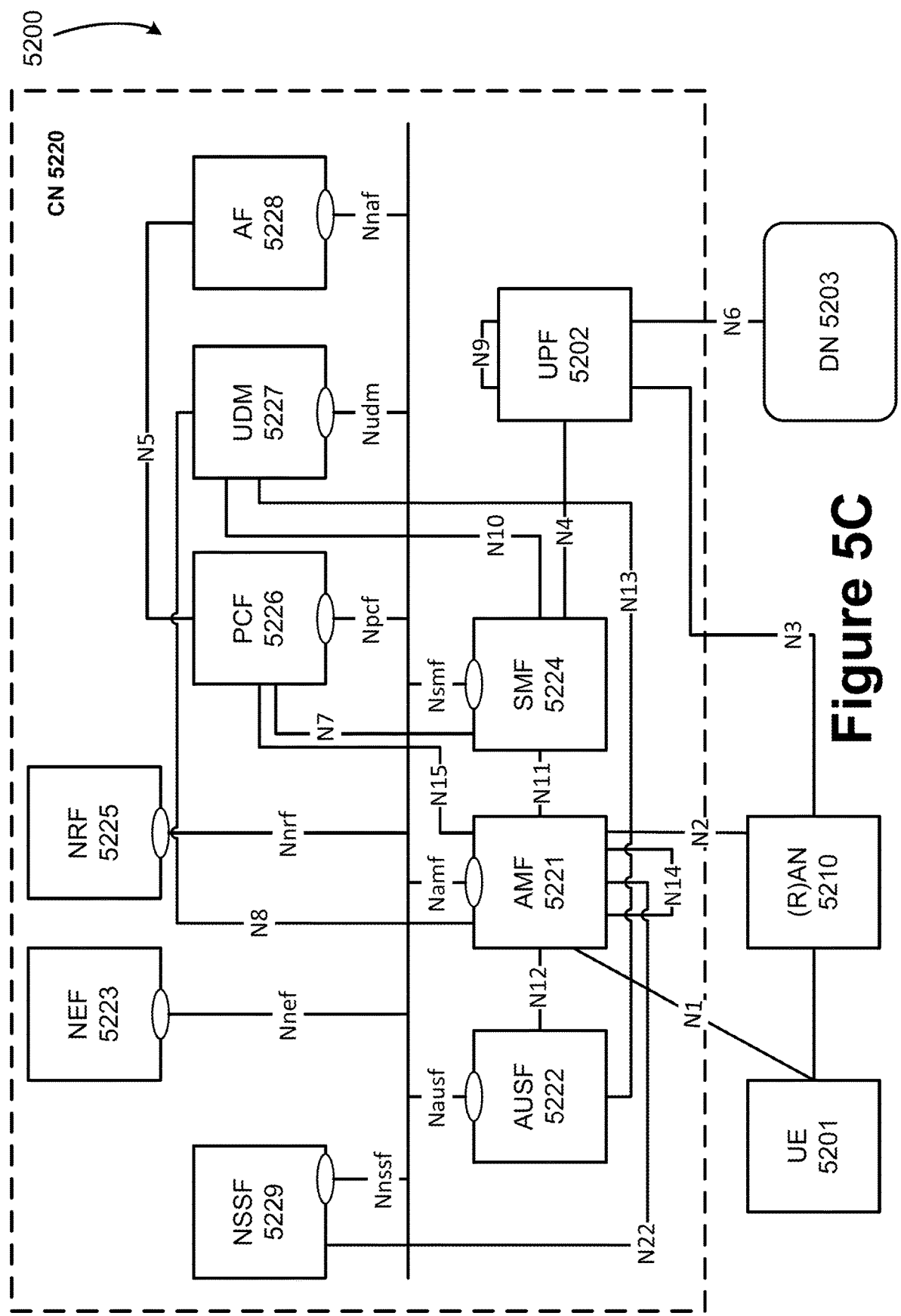
FIG. 5C illustrates an example of an architecture of a system including a second core network in accordance with various embodiments.

FIG. 5C illustrates an architecture of a system 5200 including a second CN 5220 is shown in accordance with various embodiments. The system 5200 is shown to include a UE 5201, which may be the same or similar to the UEs 501 and UE 5101 discussed previously; a (R)AN 5210, which may be the same or similar to the RAN 510 and RAN 5110 discussed previously, and which may include RAN nodes 511 discussed previously; and a Data network (DN) 5203, which may be, for example, operator services, Internet access or 3rd party services; and a 5G Core Network (5GC or CN) 5220.

The 5GC 5220 may include an Authentication Server Function (AUSF) 222; an Access and Mobility Management Function (AMF) 5221; a Session Management Function (SMF) 5224; a Network Exposure Function (NEF) 5223; a Policy Control function (PCF) 5226; a Network Function (NF) Repository Function (NRF) 5225; a Unified Data Management (UDM) 5227; an Application Function (AF) 5228; a User Plane Function (UPF) 5202; and a Network Slice Selection Function (NSSF) 5229.

The UPF 5202 may act as an anchor point for intra-RAT and inter-RAT mobility, an external PDU session point of interconnect to DN 5203, and a branching point to support multi-homed PDU session. The UPF 5202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 5202 may include an uplink classifier to support routing traffic flows to a data network. The DN 5203 may represent various network operator services, Internet access, or third party services. DN 5203 may include, or be similar to application server 530 discussed previously. The UPF 5202 may interact with the SMF 5224 via an N4 reference point between the SMF 5224 and the UPF 5202.

The AUSF 5222 may store data for authentication of UE 5201 and handle authentication related functionality. The AUSF 5222 may facilitate a common authentication framework for various access types. The AUSF 5222 may communicate with the AMF 5221 via an N12 reference point between the AMF 5221 and the AUSF 5222; and may communicate with the UDM 5227 via an N13 reference point between the UDM 5227 and the AUSF 5222. Additionally, the AUSF 5222 may exhibit an Nausf service-based interface.

The AMF 5221 may be responsible for registration management (e.g., for registering UE 5201, etc.), connection management, reachability management, mobility management, and lawful interception of AMF-related events, and access authentication and authorization. The AMF 5221 may be a termination point for the an N11 reference point between the AMF 5221 and the SMF 5224. The AMF 5221 may provide transport for Session Management (SM) messages between the UE 5201 and the SMF 5224, and act as a transparent proxy for routing SM messages. AMF 5221 may also provide transport for short message service (SMS) messages between UE 5201 and an SMS function (SMSF) (not shown by FIG. 5C). AMF 5221 may act as Security Anchor Function (SEA), which may include interaction with the AUSF 5222 and the UE 5201, receipt of an intermediate key that was established as a result of the UE 5201 authentication process. Where USIM based authentication is used, the AMF 5221 may retrieve the security material from the AUSF 5222. AMF 5221 may also include a Security Context Management (SCM) function, which receives a key from the SEA that it uses to derive access-network specific keys. Furthermore, AMF 5221 may be a termination point of RAN CP interface, which may include or be an N2 reference point between the (R)AN 5211 and the AMF 5221; and the AMF 5221 may be a termination point of NAS (N1) signalling, and perform NAS ciphering and integrity protection.

AMF 5221 may also support NAS signalling with a UE 5201 over an N3 interworking-function (IWF) interface. The N3IWF may be used to provide access to untrusted entities. N3IWF may be a termination point for the N2 interface between the (R)AN 5210 and the AMF 5221 for the control plane, and may be a termination point for the N3 reference point between the (R)AN 5210 and the UPF 5202 for the user plane. As such, the AMF 5221 may handle N2 signalling from the SMF 5224 and the AMF 5221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 5201 and AMF 5221 via an N1 reference point between the UE 5201 and the AMF 5221, and relay uplink and downlink user-plane packets between the UE 5201 and UPF 5202. The N3IWF also provides mechanisms for IPsec tunnel establishment with the UE 5201. The AMF 5221 may exhibit an Namf service-based interface, and may be a termination point for an N14 reference point between two AMFs 5221 and an N17 reference point between the AMF 5221 and a 5G-Equipment Identity Register (5G-EIR) (not shown by FIG. 5C).

The UE 5201 may need to register with the AMF 5221 in order to receive network services. Registration Management (RM) is used to register or deregister the UE 5201 with the network (e.g., AMF 5221), and establish a UE context in the network (e.g., AMF 5221). The UE 5201 may operate in an RM-REGISTERED state or an RM-DEREGISTERED state. In the RM-DEREGISTERED state, the UE 5201 is not registered with the network, and the UE context in AMF 5221 holds no valid location or routing information for the UE 5201 so the UE 5201 is not reachable by the AMF 5221. In the RM-REGISTERED state, the UE 5201 is registered with the network, and the UE context in AMF 5221 may hold a valid location or routing information for the UE 5201 so the UE 5201 is reachable by the AMF 5221. In the RM-REGISTERED state, the UE 5201 may perform mobility Registration Update procedures, perform periodic Registration Update procedure triggered by expiration of the periodic update timer (e.g., to notify the network that the UE 5201 is still active), and perform a Registration Update procedure to update UE capability information or to re-negotiate protocol parameters with the network, among others.

The AMF 5221 may store one or more RM contexts for the UE 5201, where each RM context is associated with a specific access to the network. The RM context may be a data structure, database object, etc. that indicates or stores, inter alia, a registration state per access type and the periodic update timer. The AMF 5221 may also store a 5GC MM context that may be the same or similar to the (E)MM context discussed previously. In various embodiments, the AMF 5221 may store a CE mode B Restriction parameter of the UE 5201 in an associated MM context or RM context. The AMF 5221 may also derive the value, when needed, from the UE's usage setting parameter already stored in the UE context (and/or MM/RM Context).

Connection Management (CM) may be used to establish and release a signaling connection between the UE 5201 and the AMF 5221 over the N1 interface. The signaling connection is used to enable NAS signaling exchange between the UE 5201 and the CN 120, and comprises both the AN signaling connection between the UE and the Access Network (AN) (e.g., RRC connection or UE-N3IWF connection for Non-3GPP access) and the N2 connection for the UE 5201 between the AN (e.g., RAN 5210) and the AMF 5221. The UE 5201 may operate in one of two CM states, CM-IDLE mode or CM-CONNECTED mode. When the UE 5201 is operating in the CM-IDLE state/mode, the UE 5201 may have no NAS signaling connection established with the AMF 5221 over the N1 interface, and there may be (R)AN 5210 signaling connection (e.g., N2 and/or N3 connections) for the UE 5201. When the UE 5201 is operating in the CM-CONNECTED state/mode, the UE 5201 may have an established NAS signaling connection with the AMF 5221 over the N1 interface, and there may be a (R)AN 5210 signaling connection (e.g., N2 and/or N3 connections) for the UE 5201. Establishment of an N2 connection between the (R)AN 5210 and the AMF 5221 may cause the UE 5201 to transition from CM-IDLE mode to CM-CONNECTED mode, and the UE 5201 may transition from the CM-CONNECTED mode to the CM-IDLE mode when N2 signaling between the (R)AN 5210 and the AMF 5221 is released.

The SMF 5224 may be responsible for Session Management (SM) (e.g., session establishment, modify and release, including tunnel maintain between UPF and AN node); UE IP address allocation & management (including optional Authorization); selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. SM may refer to management of a PDU session, and a PDU session or "session" may refer to a PDU Connectivity Service that provides or enables the exchange of PDUs between a UE 5201 and a data network (DN) 5203 identified by a Data Network Name (DNN). PDU Sessions may be established upon UE 5201 request, modified upon UE 5201 and 5GC 5220 request, and released upon UE 5201 and 5GC 5220 request using NAS SM signaling exchanged over the N1 reference point between the UE 5201 and the SMF 5224. Upon request from an Application Server, the 5GC 5220 may trigger a specific application in the UE 5201. In response to receipt of the trigger message, the UE 5201 may pass the trigger message (or relevant parts/information of the trigger message) to one or more identified applications in the UE 5201. The identified application(s) in the UE 5201 may establish a PDU Session to a specific DNN. The SMF 5224 may check whether the UE 5201 requests are compliant with user subscription information associated with the UE 5201. In this regard, the SMF 5224 may retrieve and/or request to receive update notifications on SMF 5224 level subscription data from the UDM 5227.

The SMF 5224 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 5224 may be included in the system 5200, which may be between another SMF 5224 in a visited network and the SMF 5224 in the home network in roaming scenarios. Additionally, the SMF 5224 may exhibit the Nsmf service-based interface.

The NEF 5223 may provide means for securely exposing the services and capabilities provided by 3GPP network functions for third party, internal exposure/re-exposure, Application Functions (e.g., AF 5228), edge computing or fog computing systems, etc. In such embodiments, the NEF 5223 may authenticate, authorize, and/or throttle the AFs. NEF 5223 may also translate information exchanged with the AF 5228 and information exchanged with internal network functions. For example, the NEF 5223 may translate between an AF-Service-Identifier and an internal 5GC information. NEF 5223 may also receive information from other network functions (NFs) based on exposed capabilities of other network functions. This information may be stored at the NEF 5223 as structured data, or at a data storage NF using a standardized interfaces. The stored information can then be re-exposed by the NEF 5223 to other NFs and AFs, and/or used for other purposes such as analytics. Additionally, the NEF 5223 may exhibit an Nnef service-based interface.

The NRF 5225 may support service discovery functions, receive NF Discovery Requests from NF instances, and provide the information of the discovered NF instances to the NF instances. NRF 5225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 5225 may exhibit the Nnrf service-based interface.

The PCF 5226 may provide policy rules to control plane function(s) to enforce them, and may also support unified policy framework to govern network behaviour. The PCF 5226 may also implement a front end (FE) to access subscription information relevant for policy decisions in a UDR of the UDM 5227. The PCF 5226 may communicate with the AMF 5221 via an N15 reference point between the PCF 5226 and the AMF 5221, which may include a PCF 5226 in a visited network and the AMF 5221 in case of roaming scenarios. The PCF 5226 may communicate with the AF 5228 via an N5 reference point between the PCF 5226 and the AF 5228; and with the SMF 5224 via an N7 reference point between the PCF 5226 and the SMF 5224. The system 200 and/or CN 120 may also include an N24 reference point between the PCF 5226 (in the home network) and a PCF 5226 in a visited network. Additionally, the PCF 5226 may exhibit an Npcf service-based interface.

The UDM 5227 may handle subscription-related information to support the network entities' handling of communication sessions, and may store subscription data of UE 5201. For example, subscription data may be communicated between the UDM 5227 and the AMF 5221 via an N8 reference point between the UDM 5227 and the AMF 5221 (not shown by FIG. 5C). The UDM 5227 may include two parts, an application FE and a User Data Repository (UDR) (the FE and UDR are not shown by FIG. 5C). The UDR may store subscription data and policy data for the UDM 5227 and the PCF 5226, and/or structured data for exposure and application data (including Packet Flow Descriptions (PFDs) for application detection, application request information for multiple UEs 201) for the NEF 5223. The Nudr service-based interface may be exhibited by the UDR 221 to allow the UDM 5227, PCF 5226, and NEF 5223 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 5224 via an N10 reference point between the UDM 5227 and the SMF 5224. UDM 5227 may also support SMS management, wherein an SMS-FE implements the similar application logic as discussed previously. Additionally, the UDM 5227 may exhibit the Nudm service-based interface.

The AF 5228 may provide application influence on traffic routing, access to the Network Capability Exposure (NCE), and interact with the policy framework for policy control. The NCE may be a mechanism that allows the 5GC 5220 and AF 5228 to provide information to each other via NEF 5223, which may be used for edge computing implementations. In such implementations, the network operator and third party services may be hosted close to the UE 5201 access point of attachment to achieve an efficient service delivery through the reduced end-to-end latency and load on the transport network. For edge computing implementations, the 5GC may select a UPF 5202 close to the UE 5201 and execute traffic steering from the UPF 5202 to DN 5203 via the N6 interface. This may be based on the UE subscription data, UE location, and information provided by the AF 5228. In this way, the AF 5228 may influence UPF (re)selection and traffic routing. Based on operator deployment, when AF 5228 is considered to be a trusted entity, the network operator may permit AF 5228 to interact directly with relevant NFs. Additionally, the AF 5228 may exhibit an Naf service-based interface.

The NSSF 5229 may select a set of network slice instances serving the UE 5201. The NSSF 5229 may also determine allowed Network Slice Selection Assistance Information (NSSAI) and the mapping to the Subscribed Single-NSSAIs (S-NSSAIs), if needed. The NSSF 5229 may also determine the AMF set to be used to serve the UE 5201, or a list of candidate AMF(s) 221 based on a suitable configuration and possibly by querying the NRF 5225. The selection of a set of network slice instances for the UE 5201 may be triggered by the AMF 5221 with which the UE 5201 is registered by interacting with the NSSF 5229, which may lead to a change of AMF 5221. The NSSF 5229 may interact with the AMF 5221 via an N22 reference point between AMF 5221 and NSSF 5229; and may communicate with another NSSF 5229 in a visited network via an N31 reference point (not shown by FIG. 5C). Additionally, the NSSF 5229 may exhibit an Nnssf service-based interface.

As discussed previously, the CN 5220 may include an SMSF, which may be responsible for SMS subscription checking and verification, and relaying SM messages to/from the UE 5201 to/from other entities, such as an SMS-GMSC/IWMSC/SMS-router. The SMS may also interact with AMF 5221 and UDM 5227 for notification procedure that the UE 5201 is available for SMS transfer (e.g., set a UE not reachable flag, and notifying UDM 5227 when UE 5201 is available for SMS).

The CN 120 may also include other elements that are not shown by FIG. 5C, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 5C). Individual NFs may share a UDSF for storing their respective unstructured data or individual NFs may each have their own UDSF located at or near the individual NFs. Additionally, the UDSF may exhibit an Nudsf service-based interface (not shown by FIG. 5C). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 5C for clarity. In one example, the CN 5220 may include an Nx interface, which is an inter-CN interface between the MME (e.g., MME 5121) and the AMF 5221 in order to enable interworking between CN 5220 and CN 5120. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 7:
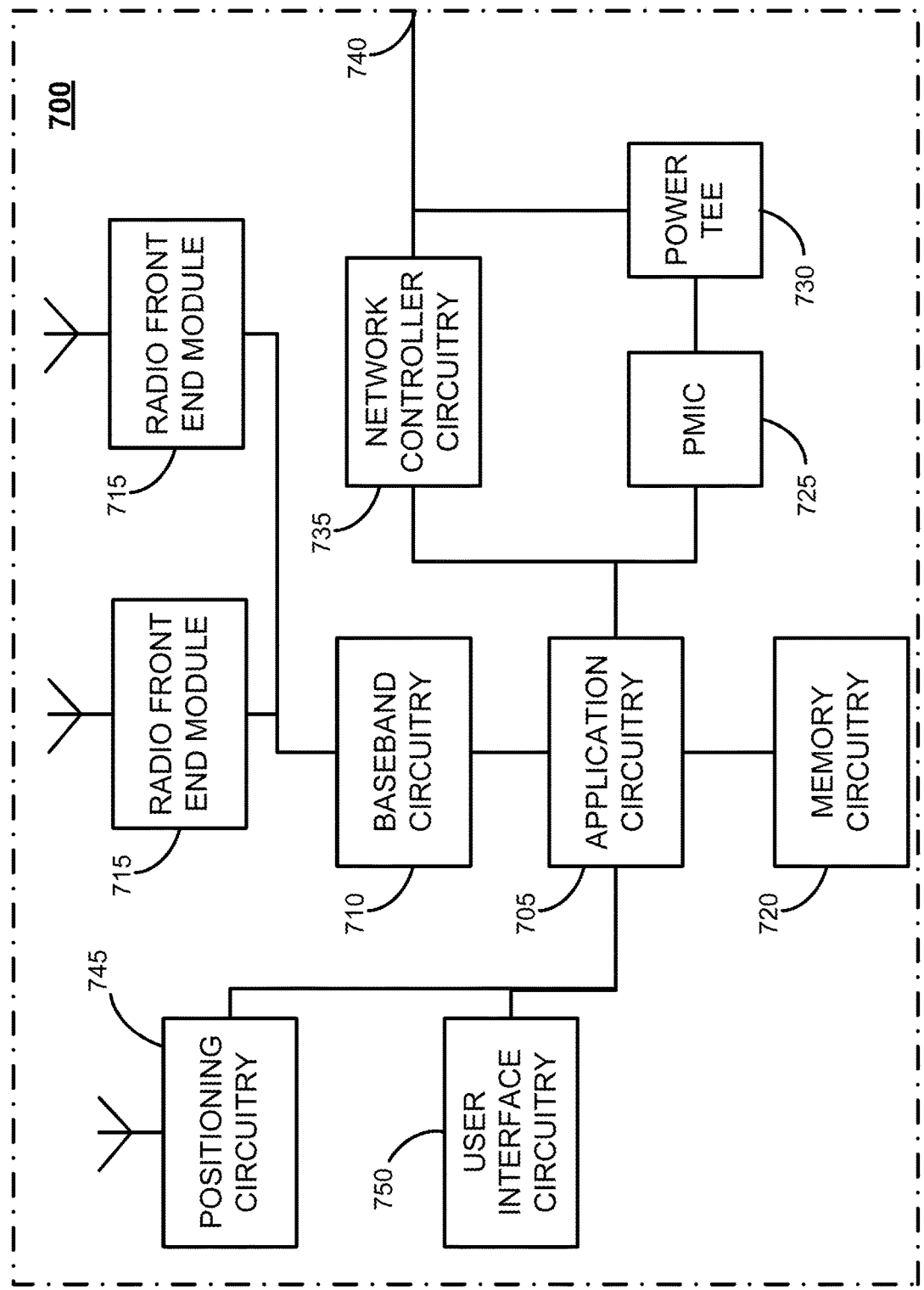
FIG. 7 illustrates an example of infrastructure equipment in accordance with various embodiments.

FIG. 7 illustrates an example of infrastructure equipment 700 in accordance with various embodiments. The system 700 may be implemented as a cellular Radio Access Network (RAN) node, a Wi-Fi access point (e.g., a router, switch, hub, etc.), and/or any other element/device discussed herein. The system 700 may include one or more of application circuitry 705, baseband circuitry 710, one or more radio front end modules 715, memory 720, power management integrated circuitry (PMIC) 725, power tee circuitry 730, network controller 735, network interface connector 740, satellite positioning circuitry 745, and user interface 750. In some embodiments, the device 700 may include additional elements such as, for example, memory/storage, display, camera, sensor, or input/output (I/O) interface.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 705 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 705 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 700 may not utilize application circuitry 705, and instead may include a special-purpose processor/controller to operate according to the various embodiments herein. The processors of application circuitry 705 may be implemented as one or more integrated circuits, such as a System on Chip (SoC), System-in-Package (SiP), a multi-chip package (MCP), and/or the like.

The memory circuitry 720 includes one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), resistive memory such as magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards. The memory circuitry 720 may also comprise persistent storage devices, which may be temporal and/or persistent storage of any type, including, but not limited to, non-volatile memory, optical, magnetic, and/or solid state mass storage, and so forth. In embodiments, the memory circuitry 720 may be disposed in or on a same die or package as the application circuitry 705 (e.g., a same SoC, a same SiP, or soldered on a same MCP as the application circuitry 705).

The memory circuitry 720 may be employed to store a working copy and a permanent copy of the programming instructions, such as drivers, for the operation of various components of system 700, an operating system of system 700, and/or one or more applications, collectively referred to as "computational logic" or "modules". The various elements may be implemented by assembler instructions supported by one or more processor(s) or high-level languages that may be compiled into such instructions. The permanent copy of the programming instructions may be placed into persistent storage devices in the factory or in the field through, for example, a distribution medium (not shown), through a communication interface (from a distribution server (not shown)), or over-the-air (OTA). In embodiments, the memory circuitry 720 stores program code, computational logic, one or more modules, etc. to carry out embodiments discussed herein (such as one or more operations of FIGS. 9-13).

In embodiments where processor circuitry 702 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

Additionally or alternatively, at least one processor of the application circuitry 705 and/or the baseband circuitry 710 may be packaged together with a storage medium having all or portions of memory circuitry 720 configured to facilitate aspects of embodiments described herein, such as the program code/modules/computational logic discussed previously. In these implementations, application circuitry 705 may include circuitry such as, but not limited to, one or more a FPDs such as FPGAs, etc.; PLDs such as CPLDs, HCPLDs, etc.; ASICs such as structured ASICs and the like; PSoCs; and the like. The circuitry of application circuitry 705 comprises logic blocks or logic fabric including and other interconnected resources that may be programmed to perform various functions, such as the procedures, methods, functions, etc. of the various embodiments discussed herein, such as the program code/modules/computational logic discussed previously. The circuitry of application circuitry 705 may include memory cells (e.g., EPROM, EEPROM, flash memory, static memory (e.g., SRAM, anti-fuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715). As used herein, the terms "instantiate", "instantiation", and the like may refer to the creation of an instance, and an "instance" may refer to a concrete occurrence of an object, which may occur, for example, during execution of program code.

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas. The RFEMs 715 may additionally or alternatively include other radio devices, such as infrared transceivers, short-range radio transceivers (e.g., Bluetooth, etc.), and so forth). The communication interfaces 610 may include communication chips (not shown) that may be configured to operate the computer device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (e.g., a "copper interconnect"), optical, or wireless. The physical connection also includes suitable input connectors (e.g., ports, receptacles, sockets, etc.) and output connectors (e.g., plugs, pins, etc.). The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

User interface circuitry 750 may include one or more user interfaces designed to enable user interaction with the system 700 or peripheral component interfaces designed to enable peripheral component interaction with the system 700. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The positioning circuitry 745, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes. Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 745) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 745 may include a Micro-Technology for Positioning, Navigation, and Timing (Micro-PNT) IC that uses a master timing clock to perform position tracking/estimation without GNSS assistance. The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 745 may provide data to application circuitry 705 which may include one or more of position data or time data. Application circuitry 705 may use the time data to synchronize operations with other radio base stations.

The components shown by FIG. 7 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 8:
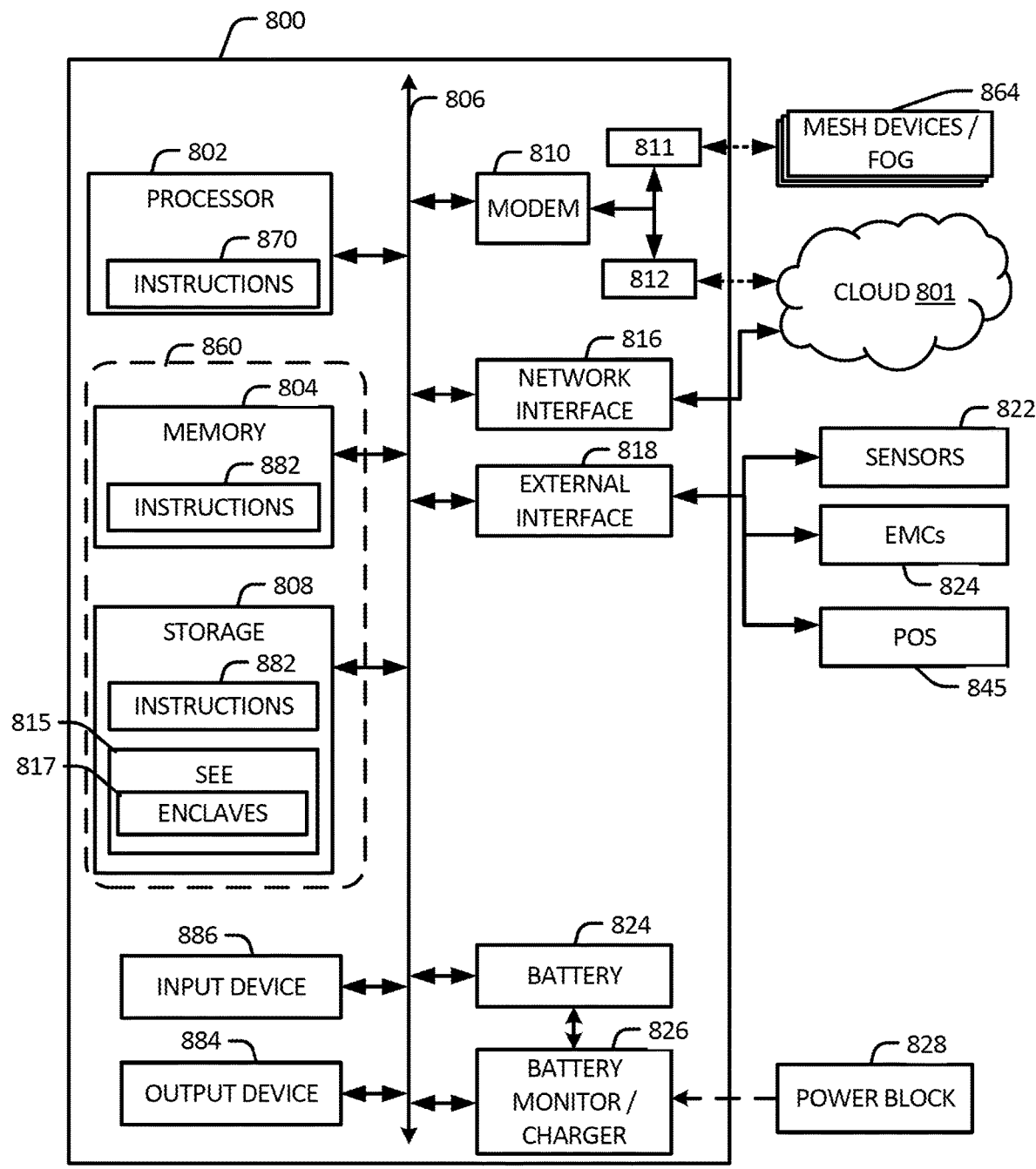
FIG. 8 illustrates an example of an implementation of a computing platform in accordance with various embodiments.

FIG. 8 illustrates an example of a platform 800 (or "device 800") in accordance with various embodiments. The computer platform 800 may be suitable for use as UEs 501/502 and/or IoT devices 104/404. Platform 800 may also be implemented in or as a server computer system or some other element, device, or system discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The example of FIG. 8 is intended to show a high level view of components of the computer platform 800. However, some of the components shown may be omitted, additional components may be present, and different arrangement of the components shown may occur in other implementations.

The platform 800 includes processor circuitry 802. The processor circuitry includes circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports. The processor(s) of processor circuitry 802 may include any combination of general-purpose processors and/or dedicated processors (e.g., graphics processors (GPUs), application processors, etc.), which may be microprocessor(s), multi-core processor(s), multithreaded processor(s), an ultra-low voltage processor(s), embedded processor(s), or other known processing element. The processors (or cores) of the processor circuitry 802 may be coupled with or may include memory/storage and may be configured to execute instructions stored in the memory/storage to enable various applications or operating systems to run on the platform 800.

As an example, the processor circuitry 802 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as one or more of Advanced Micro Devices (AMD) Ryzen® processor(s), Accelerated Processing Units (APUs), MxGPUs, or the like; A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the processor circuitry 802 may be a part of a system on a chip (SoC) in which the processor circuitry 802 and other components are formed into a single integrated circuit, or a single package, such as the Edison™ or Galileo™ SoC boards from Intel® Corporation.

Additionally or alternatively, processor circuitry 802 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 802 may comprise logic blocks or logic fabric including and other interconnected resources that may be programmed to perform various functions, such as the procedures, methods, functions, etc. of the various embodiments discussed herein. In such embodiments, the circuitry of processor circuitry 802 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 802 may communicate with a system memory circuitry 804 over an interconnect 806 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage circuitry 808 may also couple to the processor circuitry 802 via the interconnect 806. In an example, the storage circuitry 808 may be implemented via a solid-state disk drive (SSDD). Other devices that may be used for the storage circuitry 808 include flash memory cards, such as SD cards, microSD cards, xD picture cards, and the like, and USB flash drives. In low power implementations, the storage circuitry 808 may be on-die memory or registers associated with the processor circuitry 802. However, in some examples, the storage circuitry 808 may be implemented using a micro hard disk drive (HDD). Further, any number of new technologies may be used for the storage circuitry 808 in addition to, or instead of, the technologies described, such resistance change memories, phase change memories, holographic memories, or chemical memories, among others.

The memory circuitry 804 and/or storage circuitry 808 may store program code of an operating system (OS), which may be a general purpose OS or an OS specifically written for and tailored to the computing platform 800. The OSs may include one or more drivers that operate to control particular devices that are embedded in the platform 800, attached to the platform 800, or otherwise communicatively coupled with the platform 800. The drivers may include individual drivers allowing other components of the platform 800 to interact or control various input/output (I/O) devices that may be present within, or connected to, the platform 800. For example, the drivers may include a display driver to control and allow access to a display device, a touchscreen driver to control and allow access to a touchscreen interface of the platform 800, sensor drivers to obtain sensor readings of sensor circuitry 822 and control and allow access to sensor circuitry 822, EMC drivers to obtain actuator positions of the EMCs 822 and/or control and allow access to the EMCs 822, a camera driver to control and allow access to an embedded image capture device, audio drivers to control and allow access to one or more audio devices.

The storage circuitry 808 may include instructions 882 in the form of software, firmware, or hardware commands to implement the techniques described herein. Although such instructions 882 are shown as code blocks included in the memory circuitry 804 and the storage circuitry 808, it may be understood that any of the code blocks may be replaced with hardwired circuits, for example, built into an application specific integrated circuit (ASIC).

In an example, the instructions 882/870 provided via the memory circuitry 804, the storage circuitry 808, or the processor circuitry 802 may be embodied as a non-transitory, machine-readable medium 860 including code to direct the processor circuitry 802 to perform electronic operations in the platform 800. The processor circuitry 802 may access the non-transitory machine-readable medium 860 over the interconnect 806. For instance, the non-transitory, machine-readable medium 860 may be embodied by devices described for the storage circuitry 808 of FIG. 8 or may include specific storage units such as optical disks, flash drives, or any number of other hardware devices. The non-transitory, machine-readable medium 860 may include instructions 882 to direct the processor circuitry 802 to perform a specific sequence or flow of actions, for example, as described with respect to the flowchart(s) and block diagram(s) of operations and functionality depicted previously. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The components may communicate over the interconnect 806. The interconnect 806 may include any number of technologies, including industry standard architecture (ISA), extended ISA (EISA), peripheral component interconnect (PCI), peripheral component interconnect extended (PCIx), PCI express (PCIe), or any number of other technologies. The interconnect 806 may be a proprietary bus, for example, used in a SoC based system. Other bus systems may be included, such as an I2C interface, an SPI interface, point-to-point interfaces, and a power bus, among others.

The interconnect 806 couples the processor circuitry 802 to a modem circuitry 810 (also referred to as "baseband circuitry 810", "modem 810", and the like) for communications with other devices. The modem 810 comprises one or more memory devices and one or more processors (e.g., baseband processors) used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The processors of the modem 810 may be the same or similar to the processor circuitry 802 discussed previously. In various embodiments, modem 810 may interface with the application circuitry of the computing platform 800 (e.g., processor circuitry 802, memory circuitry 804, and storage circuitry 808) for generation and processing of the signals and for controlling operations of the transceivers 811, 812.

The modem 810 may process signals received from receive signal paths of the transceivers 811, 812 and generate signals for transmit signal paths of the transceivers 811, 812. The modem 810 may be used to handle various radio control functions that enable communication with one or more radio networks via the transceivers 811, 812 according to one or more particular wireless communications protocols. The radio control functions may include, but are not limited to, signal modulation/demodulation, encoding/decoding, radio frequency shifting, implementing protocol stacks, and the like. In some embodiments, modulation/demodulation by the modem 810 may include Fast-Fourier Transform (FFT), precoding, and/or constellation mapping/demapping functionality. In some embodiments, encoding/decoding circuitry of the modem 810 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. The modem 810 may pass demodulated signals obtained from the transceivers 811, 812 to other components of the computing platform 800, and may pass modulated signals to the transceivers 811, 812 for transmission to other devices.

The transceiver 811 (also referred to as a "mesh transceiver" and the like) is used for communications with other mesh devices 864. The mesh transceiver 811 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, for example, according to a cellular or other wireless wide area protocol, may occur via a WWAN unit.

The mesh transceiver 811 may communicate using multiple standards or radios (e.g., including hardware devices such as switches, filters, amplifiers, antenna elements, and the like to facilitate the communications over the air) for communications at different range. For example, the platform 800 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 812 (also referred to as a "cloud transceiver" and the like) may be included to communicate with devices or services in the cloud 801 via local or wide area network protocols. The wireless network transceiver 812 includes one or more radios (e.g., including hardware devices such as switches, filters, amplifiers, antenna elements, and the like to facilitate the communications over the air) to communicate with devices in the cloud 801. The cloud 801 may be the same or similar to cloud 401 of FIG. 4 and/or cloud 601 of FIG. 6. The wireless network transceiver 812 may be a LPWA transceiver that follows the IEEE 802.15.4, or IEEE 802.15.4g standards, among others. The platform 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 811 and wireless network transceiver 812, as described herein. For example, the radio transceivers 811 and 812 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The radio transceivers 811 and 812 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, IS100.11a, etc.) WiFi-direct, ANT/ANT+, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 811, 812 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface circuitry/controller (NIC) 816 may be included to provide a wired communication to the cloud 801 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 816 may be included to allow connect to a second network, for example, a NIC 816 providing communications to the cloud over Ethernet, and a second NIC 816 providing communications to other devices over another type of network. The NIC 816 comprises one or more dedicated processors and/or FPGAs to communicate using one or more of the aforementioned protocols. In some implementations, the NIC 816 may include multiple controllers to provide connectivity to other networks using the same or different protocols.

The interconnect 806 may couple the processor circuitry 802 to an external interface 818 (also referred to as "I/O interface circuitry" or the like) that is used to connect external devices or subsystems. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. In some implementations, the interface circuitry 818 may connect the platform 800 with positioning circuitry 845, which may be the same or similar as the positioning circuitry 745 discussed with regard to FIG. 7. The external devices may include sensor circuitry 822, such as accelerometers, level sensors, flow sensors, optical light sensors, camera sensors, temperature sensors, pressure sensors, barometric pressure sensors, and the like. The external interface 818 connects the platform 800 to electro-mechanical devices (EMCs) 824, allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various client systems. In some embodiments, the aforementioned sensor circuitry 822 and EMCs 824 may correspond to the sensors 428 discussed with regard to FIG. 4. In other embodiments, the platform 800 that utilizes the sensor circuitry 822 and EMCs 824 may correspond to the sensors 428 discussed with regard to FIG. 4.

In some optional examples, various input/output (I/O) devices may be present within, or connected to, the platform 800. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the platform 800. In another example, near-field communication (NFC) circuitry comprising an NFC controller coupled with an antenna element and a processing device may be included to read electronic tags and/or connect with another NFC-enabled device.

A battery 826 may power the platform 800, although in examples in which the platform 800 is mounted in a fixed location, it may have a power supply coupled to an electrical grid. The battery 826 may be a lithium ion battery, or a metal-air battery, such as a zinc-air battery, an aluminum-air battery, a lithium-air battery, and the like.

A battery monitor/charger 828 may be included in the platform 800 to track the state of charge (SoCh) of the battery 826. The battery monitor/charger 828 may be used to monitor other parameters of the battery 826 to provide failure predictions, such as the state of health (SoH) and the state of function (SoF) of the battery 826. The battery monitor/charger 828 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 828 may communicate the information on the battery 826 to the processor circuitry 802 over the interconnect 806. The battery monitor/charger 828 may also include an analog-to-digital (ADC) convertor that allows the processor circuitry 802 to directly monitor the voltage of the battery 826 or the current flow from the battery 826. The battery parameters may be used to determine actions that the platform 800 may perform, such as transmission frequency, mesh network operation, sensing frequency, and the like.

A power block 828, or other power supply coupled to a grid, may be coupled with the battery monitor/charger 828 to charge the battery 826. In some examples, the power block 828 may be replaced with a wireless power receiver to obtain the power wirelessly, for example, through a loop antenna in the platform 800. A wireless battery charging circuit, such as an LTC4020 chip from Linear Technologies of Milpitas, Calif., among others, may be included in the battery monitor/charger 828. The specific charging circuits chosen depend on the size of the battery 826, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Input device circuitry 886 and output device circuitry 884 may include one or more user interfaces designed to enable user interaction with the platform 800 and/or peripheral component interfaces designed to enable peripheral component interaction with the platform 800. Input device circuitry 886 may include, inter alia, one or more physical or virtual buttons (e.g., a reset button), a physical keyboard or keypad, a mouse, a touchpad, a touchscreen, microphones, a scanner, a headset, and the like. The output device circuitry 884 may include, but are not limited to one or more indicators (e.g., light emitting diodes (LEDs)), speakers or other audio emitting devices, a printer, a display screen, display device (or a touchscreen), a projector, etc. In some embodiments, the sensor circuitry 822 may be used as the input device circuitry 886 (e.g., an image capture device, motion capture device, or the like) and one or more EMCs 824 may be used as the output device circuitry 884 (e.g., an actuator to provide haptic feedback or the like). Peripheral component interfaces may include, but are not limited to, a non-volatile memory port, a universal serial bus (USB) port, an audio jack, a power supply interface, etc.

Figure 9:
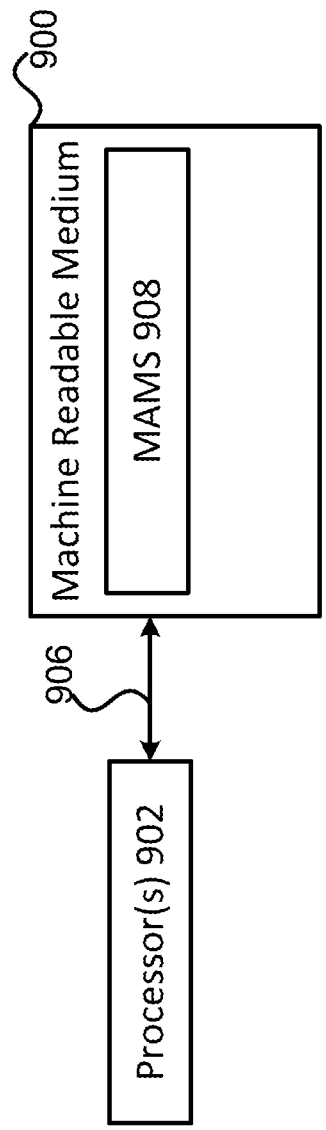
FIG. 9 illustrates example of computer-readable non-transitory storage media that may be suitable for use to store instructions that cause an apparatus, in response to execution of the instructions by the apparatus, to practice selected aspects of the present disclosure.

FIG. 9 illustrates an example of computer-readable non-transitory storage media that may be suitable for use to store instructions that cause an apparatus, in response to execution of the instructions by the apparatus, to practice selected aspects of the present disclosure. The non-transitory computer-readable storage media may include a number of programming instructions that may be configured to enable a computer system/device (e.g., equipment 700, platform 800, or the like), in in response to execution of the programming instructions, to implement various functionality related to OWD measurement discussed herein. In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Python, Ruby, Scala, Smalltalk, Java, C++, C#, or the like and procedural programming languages, such as the "C" programming language, the Go (or "Golang") programming language, or similar programming languages. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

FIG. 9 is a block diagram of a non-transitory, machine readable medium 900 including code to direct a processor 902 to perform various functions delineated by the embodiments discussed herein. The non-transitory, machine readable medium 900 may be implemented in a computer system, such as the system 700, the platform 800, or any of the aforementioned IoT devices. The processor 902 may access the non-transitory, machine readable medium 900 over a bus 906. The processor 902 may be the same or similar as described with respect to the application circuitry 705 or the baseband circuitry 710 of FIG. 7, or the processor circuitry 802 of FIG. 8. Additionally, the bus 906 may be the same or similar as described with respect to the interconnect 806 of FIG. 8. The non-transitory, machine readable medium 900 may include devices described for the memory circuitry 720 of FIG. 7, or the non-transitory machine-readable medium 860 of FIG. 8.

The non-transitory, machine readable medium 900 may include MAMS code 908 to direct the processor 902 to perform various functionality, including the steps of the processes illustrated in FIGS. 10-13 (in whole or in part) described in more detail below.

II. One-Way Delay (OWD) Measurements

Figure 6A:
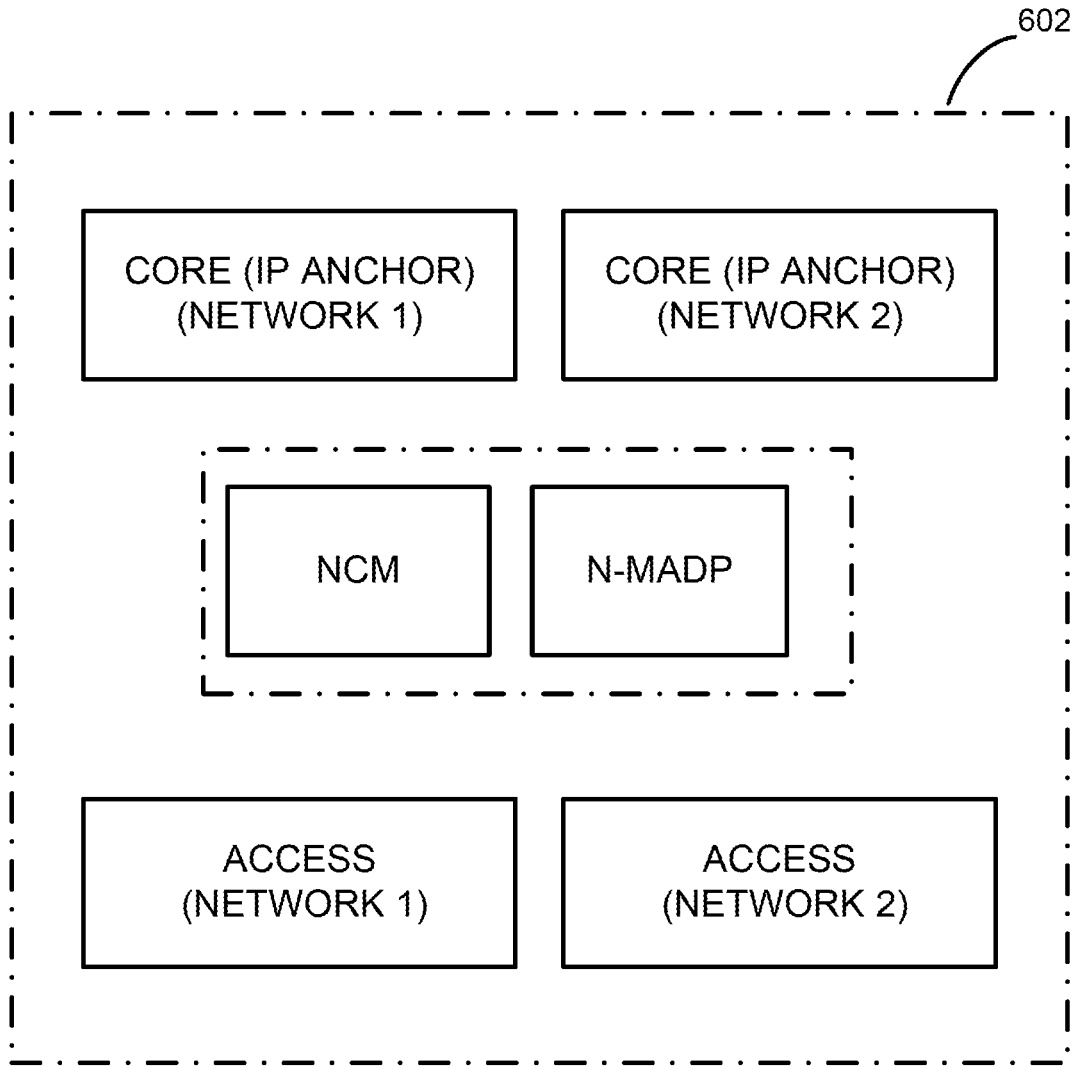
FIG. 6A illustrates an example of a MAMS network reference architecture.
Figure 6A:
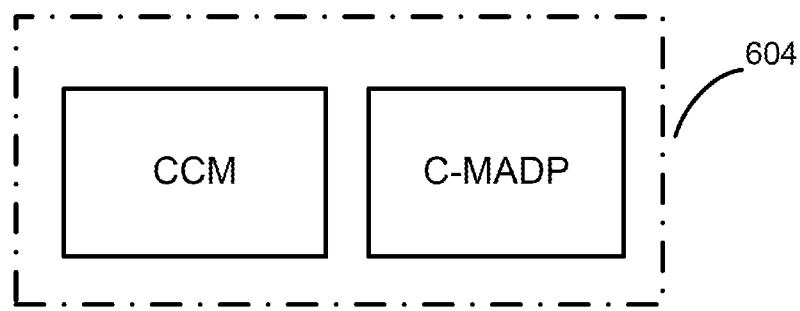

FIG. 6A shows an example of a MAMS network reference architecture with the following elements.

"Client": The end-user device (e.g., user equipment (UE) such as UE 501 and 502 depicted in FIG. 5A) supporting connections with multiple access nodes (such as nodes 511a and 511b in FIG. 5A), possibly over different access technologies.

"Access network element": The functional element in the network that delivers user data packets to the client via a point-to-point access link like WiFi, long term evolution (LTE), digital subscriber line (DSL).

"Core": The functional element that anchors the client's Internet Protocol (IP) address used for communication with applications via the network.

"Network Connection manager" (NCM): A functional entity in the network that oversees distribution of data packets over the multiple available access and core network paths. The NCM handles the MAMS control plane procedures, and configures the network (N-MADP) and client (C-MADP) user plane functions such negotiating the client on the use of available access network paths, protocols and rules for processing the user plane traffic, as well as link monitoring procedures. The control plane messages between the NCM and CCM are transported as an overlay, without any impact to the underlying access networks.

"Client Connection Manager" (CCM): A functional entity in the client that exchanges MAMS Signaling with the Network Connection Manager and configures the multiple network paths for transport of user data. The CCM is the peer functional element of the NCM in the client for handling MAMS control plane procedures. It manages multiple network connections at the client. The CCM is responsible for exchange of MAMS signaling messages with the NCM for supporting functions such as UL and DL user network path configuration for transporting user data packets, link probing and reporting to support adaptive network path selection by NCM. In the downlink, for the user data received by the client, the CCM configures C-MADP such that application data packet received over any of the accesses to reach the appropriate application on the client. In the uplink, for the data transmitted by the client, the CCM configures the C-MADP to determine the best access links to be used for uplink data based on a combination of local policy and network policy delivered by the NCM.

"Network Multi Access Data Proxy" (N-MADP): This functional entity in the network handles the user data traffic forwarding across multiple network paths. N-MADP is responsible for MAMS-specific user plane ("u-plane") functionalities in the network Such as encapsulation, fragmentation, concatenation, reordering, retransmission, etc. The N-MADP is the distribution node that routes the uplink u-plane traffic to the appropriate anchor connection towards the core network, and the downlink user traffic to the client over the appropriate delivery connection(s). In the downlink, the NCM configures the use of delivery connections, and user plane protocols at the N-MADP for transporting user data traffic. The N-MADP may implement ECMP support for the down link traffic. Alternatively, the N-MADP may be connected to a router or other like network element with ECMP functionality. The NCM configures the N-MADP with a load balancing algorithm based on static and/or dynamic network policies. These network policies may include assigning access and core paths for specific user data traffic type, data volume based percentage distribution, link availability and feedback information from exchange of MAMS signaling with the CCM at the Client, and/or the like. The N-MADP can be configured with appropriate user plane protocols to support both per-flow and per-packet traffic distribution across the delivery connections. In the uplink, the N-MADP selects the appropriate anchor connection over which to forward the user data traffic, received from the client (via the delivery connections). The forwarding rules in the uplink at the N-MADP are configured by the NCM based on application requirements, e.g., Enterprise hosted Application flows via Wi-Fi Anchor, Mobile Operator hosted applications via the Cellular Core or the like.

The NCM and the N-MADP can be either collocated with one another or instantiated on different network nodes. The NCM can setup multiple N-MADP instances in the network. The NCM controls the selection of an individual N-MADP instance by the client and the rules for distribution of user traffic across the N-MADP instances. In this way, different N-MADP instances may be used to handle different sets of clients for load balancing across clients. Additionally, the different N-MADP instances may be used for different address deployment topologies (e.g., N-MADP hosted at the user plane node at the access edge or in the core network, while the NCM hosted at the access edge node), as well as address access network technology architecture. For example, an N-MADP instance at a CN node may be used to manage traffic distribution across LTE and DSL networks, and another N-MADP instance at a (R)AN node may be used to manage traffic distribution across LTE and Wi-Fi traffic. Furthermore, a single client can be configured to use multiple N-MADP instances, which may be used for addressing different application requirements. For example, individual N-MADP instances may be used to handle TCP and UDP transport based traffic.

"Client Multi Access Data Proxy" (C-MADP): This functional entity in the client handles the user data traffic forwarding across multiple network paths. C-MADP is responsible for MAMS-specific u-plane functionalities in the client such as encapsulation, fragmentation, concatenation, reordering, retransmissions, etc. The C-MADP is configured by the CCM based on signaling exchange with the NCM and local policies at the client. The CCM configures the selection of delivery connections and the user plane protocols to be used for uplink user data traffic based on the signaling exchanged with the NCM.

The functional elements depicted in the example shown in FIG. 6A may be implemented using a variety of different physical or virtualized components. In some embodiments, for example, the functional elements within block 602 may be implemented using one or more components of an access network (AN) or radio access network (RAN), such as (R)AN 510 in FIG. 5A. In some embodiments, the N-MADP may be implemented in or by an individual RAN node, such as a RAN node 511 in FIG. 5A. In one example, the N-MADP is implemented as part of the layer 3 (L3) protocol stack (e.g., the RRC layer or the like). In another example, the N-MADP is implemented as part of a layer above L3 such as the network layer (e.g., IP, GTP-U, etc.) data-plane protocol stack of the RAN node 511. In another example of such embodiments, the N-MADP may be implemented in or by a gNB-CU of a CU/DU split architecture. In another example of such embodiments, the N-MADP may be implemented in or by a virtual baseband (BB) unit pool, or a cloud RAN (C-RAN) 510. In embodiments where a multi-access computing edge (MEC) framework is used, the N-MADP may be implemented in or by a MEC host that is located in, or colocated with, RAN 510. Alternatively, the functional elements within block 602 may be implemented by one or more components of a core network (CN) such as CN 520 in FIG. 5A. In one example, the N-MADP may run on the S-GW 5122 or P-GW 5123 of CN 5120 of FIG. 5B. In another example, the N-MADP may run on the UPF 5202 of CN 5220 of FIG. 5C.

In a process for probe-based path quality estimation, an N-MADP may exchange Probe Request (Probe-REQ) and Probe Acknowledge (Probe-ACK) messages with a C-MADP to measure the Round Trip Time (RTT) of an individual access network. Embodiments herein are directed to measuring One-Way Delay (OWD) for individual access links & network paths. Among other things, OWD is used for estimating link quality for downlink and uplink separately, as well as for dynamically balancing traffic load across multiple network paths.

FIG. 6B illustrates an example of a legacy MAMS Probe-REQ message format with the following fields.

Message Type (1 Byte): the type of the MAMS control message ("1" indicates Probe-REQ/Probe-ACK).

CID (1 Byte): the connection ID (CID) of the delivery connection for the MAMS control message.

Sequence Number (2 Bytes): the sequence number of the control message.

Probing Flag (1 Byte): the big flag to turn on or off various probing options. The probing flag comprises a Probe-ACK flag bit (Bit #0) to indicate if the Probe-ACK is expected (e.g., value "1") or not expected (e.g., value "0"); a probe type flag bit (Bit #1) to indicate if the Probe-REQ/ACK message is sent during the initialization phase (e.g., value "0") when the network path is not included for transmission of user data or the active phase (e.g., value "1") when the network path is included for transmission of user data; a bit flag (Bit #2) to indicate the presence of the R-CID field (discussed infra); and reserved bits (Bits #3-7).

Padding (variable): the padding to control the length of the message.

FIG. 6C illustrates an example of an enhanced Probe-REQ message format according to aspects of the present disclosure. In this example, the Probe-REQ message depicted in FIG. 6B includes a new Reverse Connection Identifier (R-CID). In some embodiments, the R-CID field allows an initiator (who initiates a Probe-REQ message) to specify on which access network path the responder (who responds to the Probe-REQ message with a Probe-ACK message) should send the Probe-ACK. In the example shown in FIG. 6C, the R-CID field has the same length as CID, and indicates the connection identifier (ID) of the delivery connection for the responding MAMS control message (e.g. Probe-ACK).

Additionally or alternatively, the R-CID field may be added as a new control field in a data packet. FIG. 6D shows an example of a MAMS data packet format. In some embodiments, the R-CID field may be added as a new field in the MX trailer. There may be legacy and other MX trailer fields. In some embodiments, an N-MADP or C-MADP receives a data packet with the R-CID field and (in response) sends back a data acknowledgement (Data-ACK) message. The Data-ACK message may have the same format as the Probe-ACK message described in FIG. 6C, and may carry the sequence number of the corresponding data packet in its corresponding Sequence Number field. As a result, the initiator may be able to measure "end-to-end" or "exchange-to-exchange" (e2e) delay (e.g. RTT and/or OWD), without sending out any Probe-REQ.

Figure 6E:
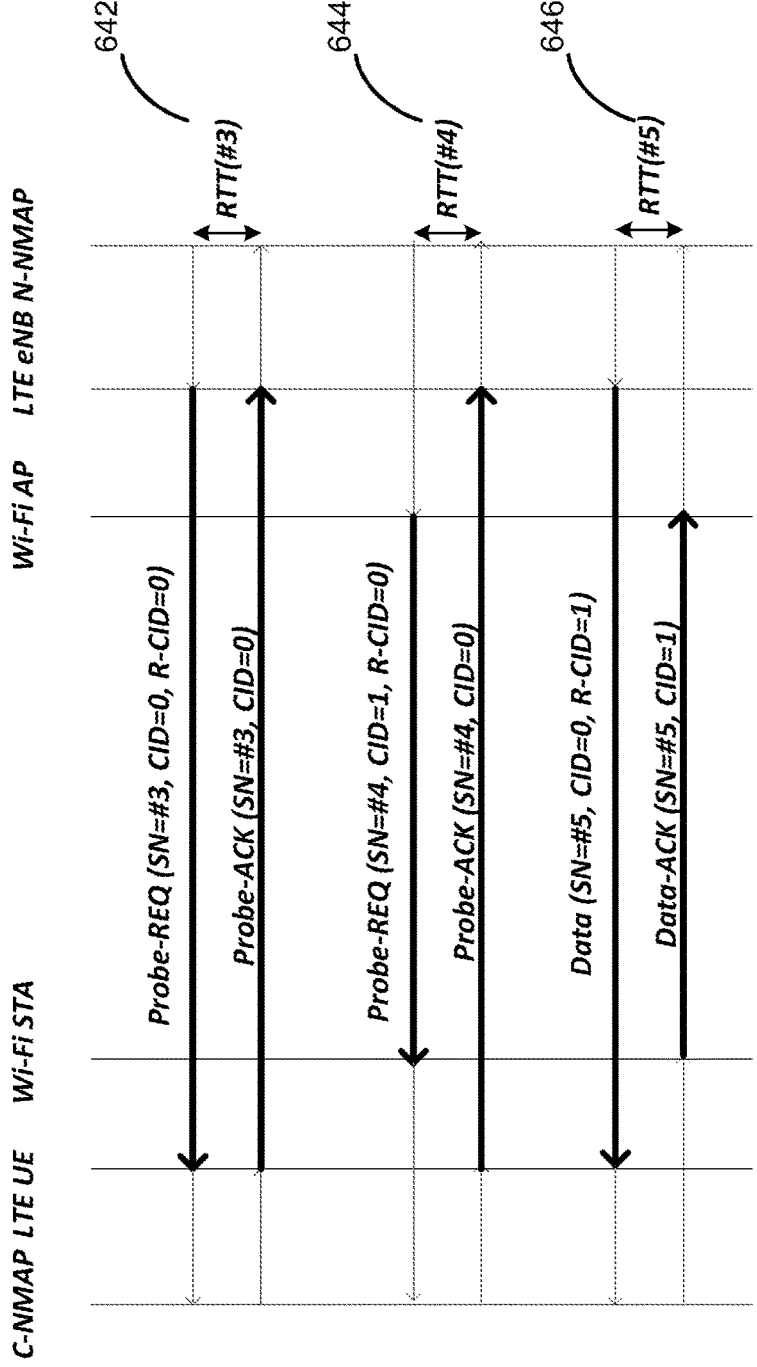
FIGS. 6E and 6F illustrate relative one-way delay (OWD) measurement procedures in accordance with various embodiments.

FIG. 6E illustrates an example of measuring OWD using the enhanced Probe-REQ message or data packet formats illustrated in FIGS. 6C and 6D, respectively. In this example, a "0" in the CID or R-CID field indicates the LTE network, while a "1" in the CID or R-CID field indicates a Wi-Fi network. The "SN" field refers to the "Sequence Number" field described above.

As depicted in FIG. 6E, to measure OWD of the forward link, the Probe-ACK message on the reverse path may be sent over the same access network such that the difference in RTT measurements is due to the forward path alone. Similarly, to measure OWD of the reverse link, the Probe-REQ messages (or Data messages) may be sent over the same access network, and the Probe-ACK (or Data-ACK) messages may be sent over multiple access networks.

As shown in FIG. 6E, an OWD measurement may be obtained based on the differences between the respective RTTs 642, 644, 646. In particular, the relative OWD of the downlink link may be determined based on RTT(#3)-RTT (#4), and the relative OWD of the uplink may be obtained by RTT(#3)-RTT (#5).

Figure 6F:
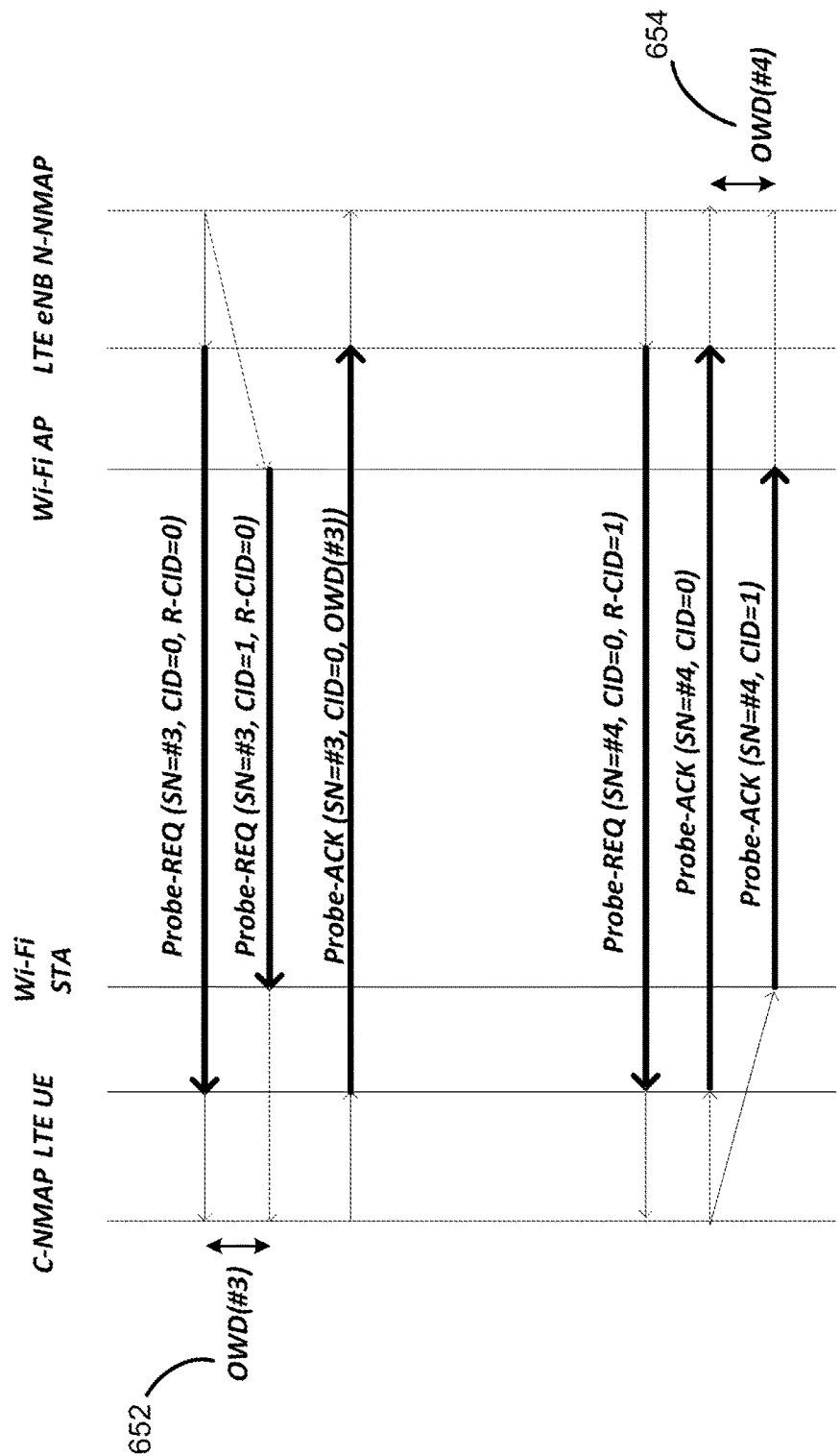

In some embodiments, as illustrated in FIG. 6F, the initiator may send the same Probe-REQ message over multiple access networks simultaneously and let the responder measure the relative OWD and report it back using the Probe-ACK message in order to help improve the accuracy of the OWD measurement. In such cases, it does not matter which access network is used for the Probe-ACK message, and the Probe-ACK message may include a new field to report the OWD measurement to the initiator. In some embodiments, a new Probe Flag field in the Probe-REQ message may be added to indicate that the responder should measure OWD and report it back in the Probe ACK message.

In some embodiments, the initiator may request that the responder send back the Probe-ACK message over multiple links simultaneously. In this manner, the initiator may measure the relative OWD of the reverse link accordingly. In such cases, a new Probe Flag field may be added to the Probe-REQ message to indicate that the responder should send back Probe-ACK over both links simultaneously.

In the example shown in FIG. 6F, the responder measures the OWD of the forward link 652 with the Probe-REQ message #3, and the initiator measures the OWD of the reverse link 654 with the Probe-ACK message #4.

FIGS. 10-13 illustrates examples of processes for performing OWD measurements in accordance with various embodiments of the present disclosure. The operations of the processes in FIGS. 10-13 may be performed by various systems (and elements thereof) described above. While particular examples and orders of operations are illustrated in FIGS. 10-13, the depicted orders of operations should not be construed to limit the scope of the embodiments in any way. Rather, the operations shown in FIGS. 10-13 may be re-ordered, broken into additional operations, combined, repeated, and/or omitted altogether while remaining within the spirit and scope of the present disclosure.

As described below, the functionality of the processes shown in FIGS. 10-13 may be performed by an N-MADP or C-MADP. In some embodiments, the C-MADP may be implemented using the components of a UE, such as the components of device 800 depicted in FIG. 8. In some embodiments, the N-MADP may be implemented using components of an access network (such as (R)AN 510 in FIG. 5A), or components of a control network (such as CN 520 in FIG. 5A). For example, the N-MADP may be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Figure 10:
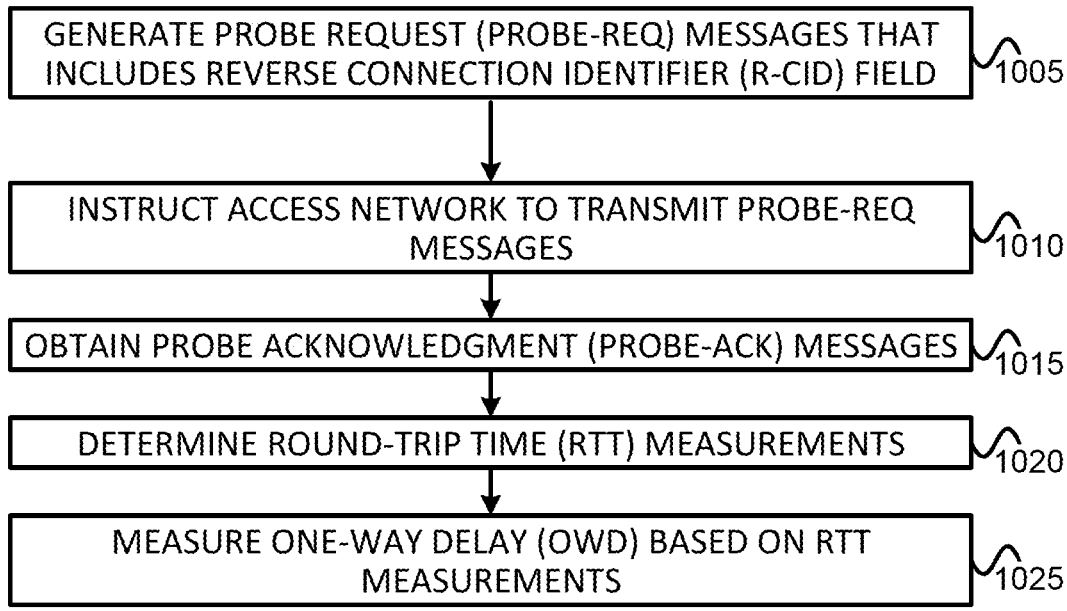
FIGS. 10-13 illustrate examples of MAMS processes according to various embodiments.

FIG. 10 illustrates a process 1000 that may be implemented using an N-MADP operating as part of, for example, (R)AN 510 or CN 520 depicted in FIG. 5A as described above. The N-MADP may include (or operate in conjunction with) processor circuitry (such as baseband circuitry 710 or application circuitry 705 in FIG. 7) to (at operation 1005) generate a Probe-REQ message to include a reverse connection identifier (R-CID) field, wherein the R-CID field is to include a connection identifier of a reverse path over which the Probe-ACK message is to be received.

The N-MADP may include (or operate in conjunction with) network interface circuitry (such as network controller circuitry 735 in FIG. 7) communicatively coupled to the processor circuitry, wherein the network interface circuitry is to: (at operation 1010) send an instruction to an access network (such as (R)AN 510 in FIG. 5A), wherein the instruction is to instruct the access network to transmit probe request (Probe-REQ) messages; and (at operation 1015) obtain probe acknowledgment (Probe-ACK) messages from the access network based on the Probe-REQ messages. At operation 1020, the processor circuitry is further to determine RTT measurements based on receipt of the Probe-ACK messages. At operation 1025, the processor circuitry is further to measure an OWD based on the RTT measurements.

In some embodiments, a first Probe-REQ message may be transmitted over a forward link of a first access network, while the reverse path over which the first Probe-ACK message (sent in response to the Probe-REQ message) is received is a reverse link of the first access network. In some embodiments, the forward link may be a downlink (DL) channel, while the reverse link is an uplink (UL) channel. Alternatively, the forward link may be a UL channel and the reverse link may be a DL channel.

In some embodiments, the network interface circuitry is to send an instruction to instruct a second access network to transmit, over a forward link of the second access network, a second Probe-REQ message including a second R-CID field to indicate the first access network as a network over which to receive a second Probe-REQ message. The processor circuitry may further determine a first RTT measurement for the first access network based on receipt of the first Probe-ACK message, and a RTT measurement for the second access network based on receipt of the second Probe-ACK message. The processor circuitry may measure the OWD between the forward link of the first access network and the forward link of the second access network based on the RTT measurement for the first access network and the RTT measurement for the second access network as described, for example, with reference to FIG. 6E above.

Embodiments of the present disclosure may operate in conjunction with different types (and combinations) of access networks, such as any of the network technologies discussed herein. With regards to reference to the "first" and "second" access networks described in conjunction with FIGS. 10-13, for example, the "first" access network may be a Wi-Fi network while the "second" access network is an LTE network. Alternatively, the "first" access network may be an LTE network while the "second" access network may be a Wi-Fi network.

Figure 11:
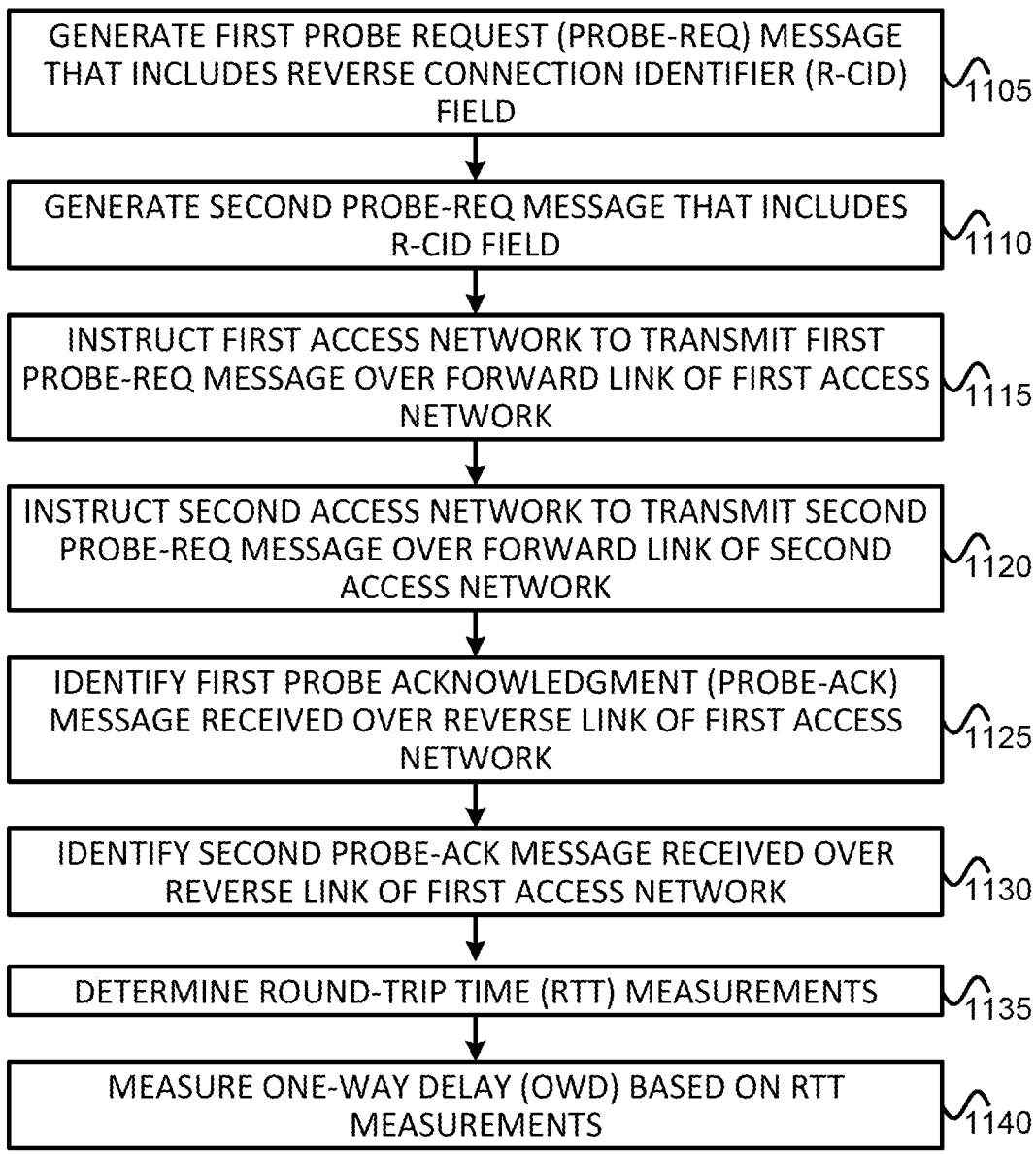

FIG. 11 illustrates another process that may be performed by components implementing an N-MADP as described above for FIG. 10. In this example, process 1100 includes generating a first Probe-REQ message that includes an R-CID field (at operation 1105), generating a second Probe-REQ message that includes an R-CID field (at operation 1110), instructing a first access network to transmit the first Probe-REQ message over a forward link of the first access network (at operation 1115), and instructing a second access network to transmit the second Probe-REQ message over a forward link of the second access network (at operation 1120).

Process 1100 further includes identifying a first Probe-ACK message received over a reverse link of the first access network (at operation 1125), identifying a second Probe-ACK message received over a reverse link of the second access network (at operation 1130), determining a first RTT measurement and a second RTT measurement based on receipt of the first Probe-ACK message and second Probe-ACK message, respectively (at operation 1135), and (at operation 1140) measuring OWD between the forward link of the first access network and the forward link of the second access network based on the first and second RTT measurements. As with the process 1000 in FIG. 10, the R-CID fields in the first and second Probe-REQ messages are to indicate that the first access network is a network over which to receive the Probe-ACK message.

Figure 12:
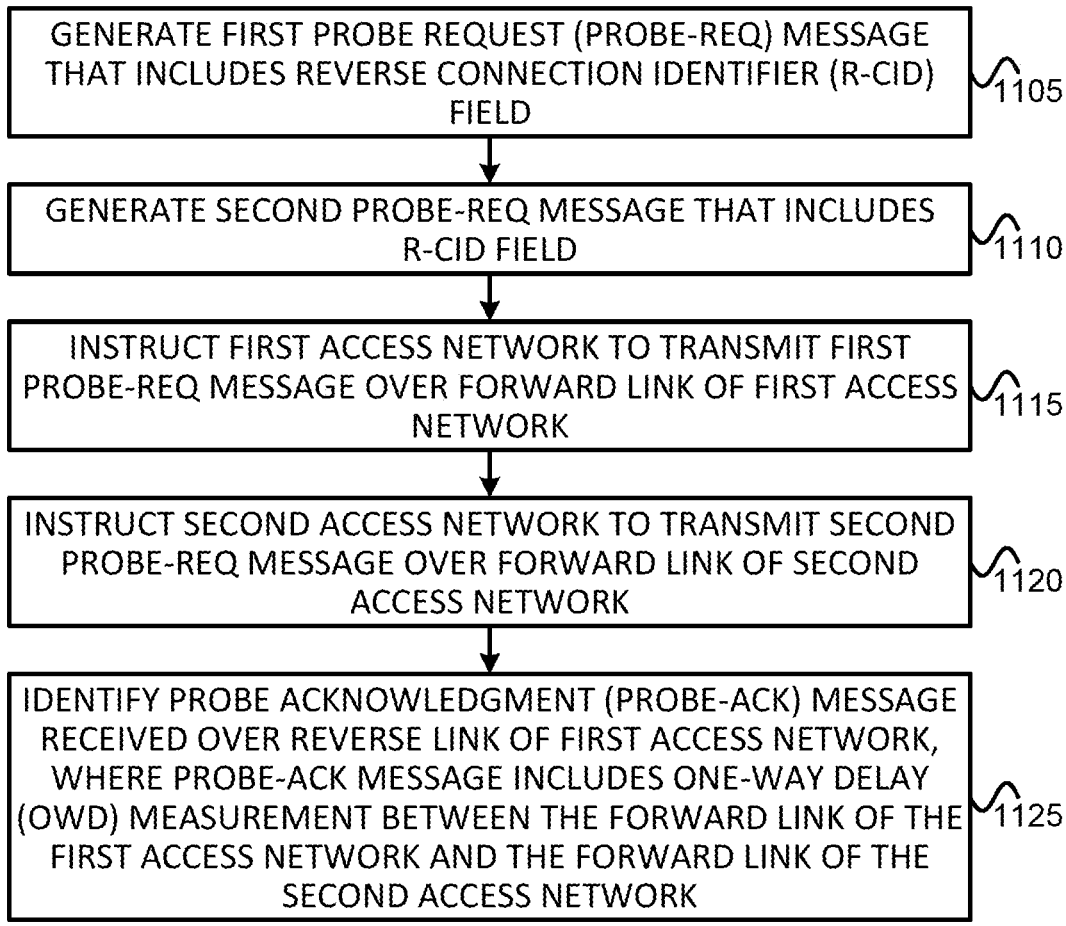

FIG. 12 illustrates another process that may be performed by components implementing an N-MADP as described above for FIG. 10. In this example, process 1200 includes generating a first Probe-REQ message that includes an R-CID field (at operation 1205), generating a second Probe-REQ message that includes an R-CID field (at operation 1210), instructing a first access network to transmit the first Probe-REQ message over a forward link of the first access network (at operation 1215), instructing a second access network to transmit the second Probe-REQ message over a forward link of the second access network (at operation 1220), and (at operation 1125) identifying a Probe-ACK message received over a reverse link of the first access network, wherein the Probe-ACK message includes a one-way delay (OWD) measurement between the forward link of the first access network and the forward link of the second access network. The R-CID fields in the first and second Probe-REQ messages are to indicate that the first access network is a network over which to receive the Probe-ACK message.

The Probe-REQ messages may include probing flag fields to convey information to the responder. For example, the Probe-REQ messages may include probing flag fields to indicate that: the OWD is to be measured; and/or the Probe-ACK message is to include the OWD measurement. Additionally, each Probe-REQ message may include a sequence number associated with the respective Probe-REQ message. In FIG. 6E, for example, the first (top) Probe-REQ message may include a sequence number of "3," while the second (lower) Probe-REQ message may include a sequence number of "4." The Probe-ACK message corresponding to a respective Probe-REQ message may likewise include the sequence number associated with the respective Probe-REQ message. Continuing with the example shown in FIG. 6E, the first Probe-ACK message may contain a sequence number of "3," while the second Probe-ACK message may contain a sequence number of "4."

Figure 13:
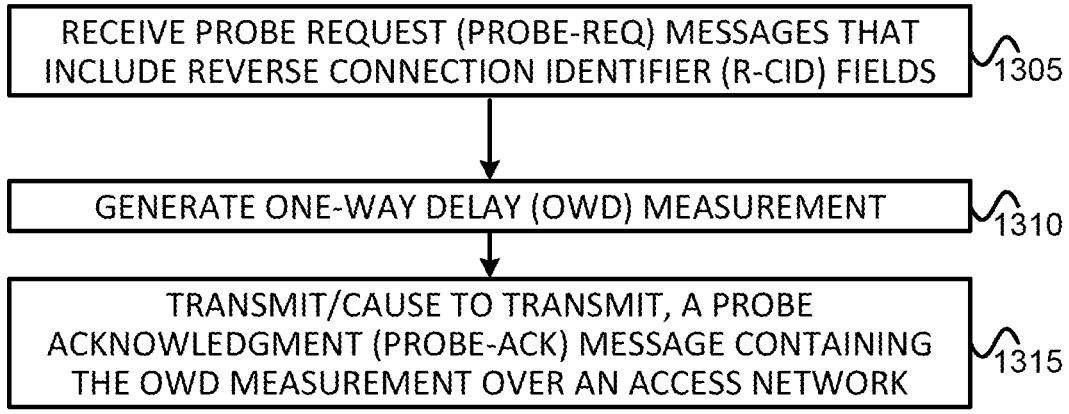

FIG. 13 illustrates a process 1300 that may be performed, for example, by a C-MADP implemented by a UE. In this example, process 1300 includes (at operation 1305) receiving Probe-REQ messages that includes an R-CID fields indicating a reverse link over which to transmit a Probe-ACK message. For example, the UE may include communication circuitry to: receive, over a first link of a first access network, a first Probe-REQ message that includes a R-CID field to indicate the first access network as a network over which to receive Probe-ACK message; and receive, over a first link of a second access network, a second Probe-REQ message including a second R-CID field to indicate the first access network as a network over which to receive the Probe-ACK message.

Process 1300 further includes generating a OWD measurement (at operation 1310), and transmitting (or causing/instructing an access network to transmit) a Probe-ACK message containing the OWD measurement over the access network. Continuing the example from the preceding paragraph, the UE may include processor circuitry to: generate a one-way delay (OWD) measurement between the first link of the first access network and the first link of the second access network; and send an instruction to cause a first access technology to transmit the Probe-ACK message over a second link of the first access network, or the instruction to cause a second access technology to transmit the Probe-ACK message over a second link of the second access network, wherein the Probe-ACK message includes the one-way delay (OWD) measurement between the first link of the first access network and the first link of the second access network.

III. Examples

Some non-limiting examples are as follows. The following examples pertain to further embodiments, and specifics in the examples may be used anywhere in one or more embodiments discussed previously. Any of the following examples may be combined with any other example, or any embodiment discussed herein, unless explicitly stated otherwise.

Example 1 includes an apparatus to be employed as a network multi-access data proxy (N-MADP), the apparatus comprising: network interface circuitry to: send an instruction to an access network, wherein the instruction is to instruct the access network to transmit a probe request (Probe-REQ) message; and obtain a probe acknowledgment (Probe-ACK) message from the access network based on the Probe-REQ message; and processor circuitry communicatively coupled with network interface circuitry, wherein the processor circuitry is to generate the Probe-REQ message to include a reverse connection identifier (R-CID) field, wherein the R-CID field is to include a connection identifier of a reverse path over which the Probe-ACK message is to be received.

Example 2 includes the apparatus of example 1 or some other example herein, wherein the Probe-REQ message is transmitted over a forward link of a first access network, and wherein the reverse path is a reverse link of the first access network.

Example 3 includes the apparatus of example 2 or some other example herein, wherein the forward link is a downlink (DL) channel and the reverse link is an uplink (UL) channel.

Example 4 includes the apparatus of example 2 or some other example herein, wherein the forward link is a UL channel and the reverse link is a DL channel.

Example 5 includes the apparatus of example 2 or some other example herein, wherein the processor circuitry is further to determine a round-trip time (RTT) measurement for the first access network based on receipt of the Probe-ACK message; wherein the network circuitry is further to instruct a second access network to transmit, over a forward link of the second access network, a second Probe-REQ message including a second R-CID field to indicate the first access network as a network over which to receive a second Probe-REQ message; and wherein the processor circuitry is further to: identify the second Probe-ACK message received over the reverse link of the first access network; determine a RTT measurement for the second access network based on receipt of the second Probe-ACK message; and measure a one-way delay (OWD) between the forward link of the first access network and the forward link of the second access network based on the RTT measurement for the first access network and the RTT measurement for the second access network.

Example 6 includes the apparatus of example 5 or some other example herein, wherein the first access network is a Wi-Fi network and the second access network is a long-term evolution (LTE) network.

Example 7 includes the apparatus of example 5 or some other example herein, wherein the first access network is an LTE network and the second access network is a Wi-Fi network.

Example 8 includes the apparatus of example 2 or some other example herein, wherein the processor circuitry is further to: transmit, over a forward link of a second access network, a second Probe-REQ message including a second R-CID field to indicate the first access network as a network over which to receive the Probe-ACK message, wherein the Probe-ACK message includes a one-way delay (OWD) measurement between the forward link of the first access network and the forward link of the second access network.

Example 9 includes the apparatus of example 8 or some other example herein, wherein the Probe-REQ message and the second Probe-REQ message each include a probing flag field to indicate that the OWD is to be measured.

Example 10 includes the apparatus of example 8 or some other example herein, wherein the Probe-REQ message and the second Probe-REQ message each include a probing flag field to indicate that the Probe-ACK message is to include the OWD measurement.

Example 11 includes the apparatus of example 8 or some other example herein, wherein the Probe-REQ message includes a sequence number associated with the Probe-REQ message, and wherein the Probe-ACK message includes the sequence number associated with the Probe-REQ message.

Example 12 includes the apparatus of example 1 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 13 includes one or more non-transitory computer-readable media storing instructions, that, when executed by one or more processors, cause a Network Multi-Access Data Proxy (N-MADP) device to: send an instruction to instruct a first access network to transmit, over a forward link of the first access network, a first probe request (Probe-REQ) message that includes a reverse connection identifier (R-CID) field to indicate the first access network as a network over which to receive a first probe acknowledge (Probe-ACK) message; identify the first Probe-ACK message received over a reverse link of the first access network; determine a round-trip time (RTT) measurement for the first access network based on receipt of the first Probe-ACK message; send an instruction to instruct a second access network to transmit, over a forward link of the second access network, a second Probe-REQ message including a second R-CID field to indicate the first access network as a network over which to receive a second Probe-REQ message; identify the second Probe-ACK message received over the reverse link of the first access network; determine a RTT measurement for the second access network based on receipt of the second Probe-ACK message; and measure one-way delay (OWD) between the forward link of the first access network and the forward link of the second access network based on the RTT measurement for the first access network and the RTT measurement for the second access network.

Example 14 includes the one or more computer-readable media of example 13 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 15 includes the one or more computer-readable media of example 13 or some other example herein, wherein the forward link is a downlink (DL) and the reverse link is an uplink (UL).

Example 16 includes the one or more computer-readable media of example 13 or some other example herein, wherein the forward link is a UL and the reverse link is a DL.

Example 17 includes the one or more computer-readable media of example 13 or some other example herein, wherein the first access network is a Wi-Fi network and the second access network is a long-term evolution (LTE) network.

Example 18 includes the one or more computer-readable media of example 13 or some other example herein, wherein the first access network is an LTE network and the second access network is a Wi-Fi network.

Example 19 includes an apparatus of a user equipment (UE), the apparatus comprising: communication circuitry to: receive, over a first link of a first access network, a first probe request (Probe-REQ) message that includes a reverse connection identifier (R-CID) field to indicate the first access network as a network over which to receive a probe acknowledge (Probe-ACK) message; and receive, over a first link of a second access network, a second Probe-REQ message including a second R-CID field to indicate the first access network as a network over which to receive the Probe-ACK message; and processor circuitry communicatively coupled to the communication circuitry to: generate a one-way delay (OWD) measurement between the first link of the first access network and the first link of the second access network; and send an instruction to cause a first access technology to transmit the Probe-ACK message over a second link of the first access network, or the instruction to cause a second access technology to transmit the Probe-ACK message over a second link of the second access network, wherein the Probe-ACK message includes the one-way delay (OWD) measurement between the first link of the first access network and the first link of the second access network.

Example 20 includes the apparatus of example 19 or some other example herein, wherein the first Probe-REQ message and the second Probe-REQ message each include a probing flag field to indicate that the OWD is to be measured.

Example 21 includes the apparatus of example 19 or some other example herein, wherein the first Probe-REQ message and the second Probe-REQ message each include a probing flag field to indicate that the Probe-ACK message is to include the OWD measurement.

Example 22 includes one or more non-transitory computer-readable media storing instructions, that, when executed by one or more processors, cause a Network Multi-Access Data Proxy (N-MADP) device to: transmit, over a first link of a first access network, a probe request (Probe-REQ) message that includes a reverse connection identifier (R-CID) field to indicate the first access network as a network over which to receive a probe acknowledge (Probe-ACK) message; identify a first Probe-ACK message received over a second link of the first access network; identify a second Probe-ACK message received over a second link of a second access network; measure one-way delay (OWD) between the second link of the first access network and the second link of the second access network based on the first Probe-ACK message and the second Probe-ACK message.

Example 23 includes the one or more computer-readable media of example 22 or some other example herein, wherein the Probe-REQ message includes a probing flag field to indicate that the first Probe-ACK message and the second Probe-ACK message are to be transmitted simultaneously.

Example 24 includes the one or more computer-readable media of example 22 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 25 includes the one or more computer-readable media of example 22 or some other example herein, wherein to measure the OWD between the second link of the first access network and the second link of the second access network, execution of the instructions is to cause the N-MADP device to: determine a round-trip time (RTT) measurement for the first access network based on receipt of the first Probe-ACK message; determine a round-trip time (RTT) measurement for the second access network based on receipt of the second Probe-ACK message; determine the one-way delay (OWD) between the second link of the first access network and the second link of the second access network based on a difference between the RTT measurement for the first access network and the RTT measurement for the second access network.

Example 26 includes a method to be employed by a network multi-access data proxy (N-MADP), the method comprising: sending an instruction to an access network, wherein the instruction is to instruct the access network to transmit a probe request (Probe-REQ) message; obtaining a probe acknowledgment (Probe-ACK) message from the access network based on the Probe-REQ message; and generating the Probe-REQ message to include a reverse connection identifier (R-CID) field, wherein the R-CID field is to include a connection identifier of a reverse path over which the Probe-ACK message is to be received.

Example 27 includes the method of example 26 or some other example herein, wherein the Probe-REQ message is transmitted over a forward link of a first access network, and wherein the reverse path is a reverse link of the first access network.

Example 28 includes the method of example 27 or some other example herein, wherein the forward link is a downlink (DL) channel and the reverse link is an uplink (UL) channel.

Example 29 includes the method of example 27 or some other example herein, wherein the forward link is a UL channel and the reverse link is a DL channel.

Example 30 includes the method of example 27 or some other example herein, wherein the method further comprises: determining a round-trip time (RTT) measurement for the first access network based on receipt of the Probe-ACK message; transmitting, over a forward link of the second access network, a second Probe-REQ message including a second R-CID field to indicate the first access network as a network over which to receive a second Probe-REQ message; identifying the second Probe-ACK message received over the reverse link of the first access network; determining a RTT measurement for the second access network based on receipt of the second Probe-ACK message; and measuring a one-way delay (OWD) between the forward link of the first access network and the forward link of the second access network based on the RTT measurement for the first access network and the RTT measurement for the second access network.

Example 31 includes the method of example 30 or some other example herein, wherein the first access network is a Wi-Fi network and the second access network is a long-term evolution (LTE) network.

Example 32 includes the method of example 30 or some other example herein, wherein the first access network is an LTE network and the second access network is a Wi-Fi network.

Example 33 includes the method of example 27 or some other example herein, wherein the further comprises: transmitting, over a forward link of a second access network, a second Probe-REQ message including a second R-CID field to indicate the first access network as a network over which to receive the Probe-ACK message, wherein the Probe-ACK message includes a one-way delay (OWD) measurement between the forward link of the first access network and the forward link of the second access network.

Example 34 includes the method of example 33 or some other example herein, wherein the Probe-REQ message and the second Probe-REQ message each include a probing flag field to indicate that the OWD is to be measured.

Example 35 includes the method of example 33 or some other example herein, wherein the Probe-REQ message and the second Probe-REQ message each include a probing flag field to indicate that the Probe-ACK message is to include the OWD measurement.

Example 36 includes the method of example 33 or some other example herein, wherein the Probe-REQ message includes a sequence number associated with the Probe-REQ message, and wherein the Probe-ACK message includes the sequence number associated with the Probe-REQ message.

Example 37 includes the method of example 25 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 38 includes a method to be performed by a Network Multi-Access Data Proxy (N-MADP) device, the method comprising: sending an instruction to instruct a first access network to transmit, over a forward link of the first access network, a first probe request (Probe-REQ) message that includes a reverse connection identifier (R-CID) field to indicate the first access network as a network over which to receive a first probe acknowledge (Probe-ACK) message; identifying the first Probe-ACK message received over a reverse link of the first access network; determining a round-trip time (RTT) measurement for the first access network based on receipt of the first Probe-ACK message; sending an instruction to instruct a second access network to transmit, over a forward link of the second access network, a second Probe-REQ message including a second R-CID field to indicate the first access network as a network over which to receive a second Probe-REQ message; identifying the second Probe-ACK message received over the reverse link of the first access network; determining a RTT measurement for the second access network based on receipt of the second Probe-ACK message; and measuring one-way delay (OWD) between the forward link of the first access network and the forward link of the second access network based on the RTT measurement for the first access network and the RTT measurement for the second access network.

Example 39 includes the method of example 38 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 40 includes the method of example 38 or some other example herein, wherein the forward link is a downlink (DL) and the reverse link is an uplink (UL).

Example 41 includes the method of example 38 or some other example herein, wherein the forward link is a UL and the reverse link is a DL.

Example 42 includes the method of example 38 or some other example herein, wherein the first access network is a Wi-Fi network and the second access network is a long-term evolution (LTE) network.

Example 43 includes the method of example 38 or some other example herein, wherein the first access network is an LTE network and the second access network is a Wi-Fi network.

Example 44 includes a method to be performed by a user equipment (UE), the method comprising: receiving, over a first link of a first access network, a first probe request (Probe-REQ) message that includes a reverse connection identifier (R-CID) field to indicate the first access network as a network over which to receive a probe acknowledge (Probe-ACK) message; receiving, over a first link of a second access network, a second Probe-REQ message including a second R-CID field to indicate the first access network as a network over which to receive the Probe-ACK message; generating a one-way delay (OWD) measurement between the first link of the first access network and the first link of the second access network; and sending an instruction to cause a first access technology to transmit the Probe-ACK message over a second link of the first access network, or the instruction to cause a second access technology to transmit the Probe-ACK message over a second link of the second access network, wherein the Probe-ACK message includes the one-way delay (OWD) measurement between the first link of the first access network and the first link of the second access network.

Example 45 includes the method of example 44 or some other example herein, wherein the first Probe-REQ message and the second Probe-REQ message each include a probing flag field to indicate that the OWD is to be measured.

Example 46 includes the method of example 44 or some other example herein, wherein the first Probe-REQ message and the second Probe-REQ message each include a probing flag field to indicate that the Probe-ACK message is to include the OWD measurement.

Example 47 includes a method for causing a Network Multi-Access Data Proxy (N-MADP) device to: transmit, over a first link of a first access network, a probe request (Probe-REQ) message that includes a reverse connection identifier (R-CID) field to indicate the first access network as a network over which to receive a probe acknowledge (Probe-ACK) message; identify a first Probe-ACK message received over a second link of the first access network; identify a second Probe-ACK message received over a second link of a second access network; measure one-way delay (OWD) between the second link of the first access network and the second link of the second access network based on the first Probe-ACK message and the second Probe-ACK message.

Example 48 includes the method of example 47 or some other example herein, wherein the Probe-REQ message includes a probing flag field to indicate that the first Probe-ACK message and the second Probe-ACK message are to be transmitted simultaneously.

Example 49 includes the method of example 47 or some other example herein, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

Example 50 includes the method of example 47 or some other example herein, wherein measuring the OWD between the second link of the first access network and the second link of the second access network includes: determining a round-trip time (RTT) measurement for the first access network based on receipt of the first Probe-ACK message; determining a round-trip time (RTT) measurement for the second access network based on receipt of the second Probe-ACK message; and determining the one-way delay (OWD) between the second link of the first access network and the second link of the second access network based on a difference between the RTT measurement for the first access network and the RTT measurement for the second access network.

Example 51 may include an apparatus comprising means to perform one or more elements of a method described in or related to any of examples 1-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described herein.

Example 53 may include an apparatus comprising logic, modules, or circuitry to perform one or more elements of a method described in or related to any of examples 1-50, or any other method or process described herein.

Example 54 may include a method, technique, or process as described in or related to any of examples 1-50, or portions or parts thereof.

Example 55 may include an apparatus comprising: one or more processors and one or more computer readable media comprising instructions that, when executed by the one or more processors, cause the one or more processors to perform the method, techniques, or process as described in or related to any of examples 1-50, or portions thereof.

Example 56 may include a signal as described in or related to any of examples 1-50, or portions or parts thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, aspects of the present disclosure may take the form of a computer program product embodied in any tangible or non-transitory medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

What is claimed is:

1. An apparatus to be employed as a network multi-access data proxy (N-MADP), the apparatus comprising:
   network interface circuitry to:
      send an instruction to an access network, wherein the instruction is to instruct the access network to transmit a probe request (Probe-REQ) message;
      obtain a probe acknowledgment (Probe-ACK) message from the access network based on the Probe-REQ message; and
   processor circuitry communicatively coupled with network interface circuitry, wherein the processor circuitry is to generate the Probe-REQ message to include a reverse connection identifier (R-CID) field, wherein the R-CID field is to include a connection identifier of a reverse path over which the Probe-ACK message is to be received, wherein the Probe-REQ message is transmitted over a forward link of a first access network, and wherein the reverse path is a reverse link of the first access network;

wherein the processor circuitry is further to determine a round-trip time (RTT) measurement for the first access network based on receipt of the Probe-ACK message;

wherein the network interface circuitry is to send another instruction to instruct a second access network to transmit, over a forward link of the second access network, a second Probe-REQ message including a second R-CID field to indicate the first access network as a network over which to receive the second Probe-REQ message; and wherein the processor circuitry is further to:
identify a second Probe-ACK message received over the reverse link of the first access network;
determine a RTT measurement for the second access network based on receipt of the second Probe-ACK message; and
measure a one-way delay (OWD) between the forward link of the first access network and the forward link of the second access network based on the RTT measurement for the first access network and the RTT measurement for the second access network.

2. The apparatus of claim 1, wherein the forward link is a downlink (DL) channel and the reverse link is an uplink (UL) channel.

3. The apparatus of claim 1, wherein the forward link is a UL channel and the reverse link is a DL channel.

4. The apparatus of claim 1, wherein the first access network is a Wi-Fi network and the second access network is a long-term evolution (LTE) network.

5. The apparatus of claim 1, wherein the first access network is an LTE network and the second access network is a Wi-Fi network.

6. The apparatus of claim 1, wherein the processor circuitry is further to:
transmit, over a forward link of a second access network, a second Probe-REQ message including a second R-CID field to indicate the first access network as a network over which to receive the Probe-ACK message, wherein the Probe-ACK message includes a one-way delay (OWD) measurement between the forward link of the first access network and the forward link of the second access network.

7. The apparatus of claim 6, wherein the Probe-REQ message and the second Probe-REQ message each include a probing flag field to indicate that the OWD is to be measured.

8. The apparatus of claim 6, wherein the Probe-REQ message and the second Probe-REQ message each include a probing flag field to indicate that the Probe-ACK message is to include the OWD measurement.

9. The apparatus of claim 6, wherein the Probe-REQ message includes a sequence number associated with the Probe-REQ message, and wherein the Probe-ACK message includes the sequence number associated with the Probe-REQ message.

10. The apparatus of claim 1, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

11. One or more non-transitory computer-readable media storing instructions, that, when executed by one or more processors, cause a Network Multi-Access Data Proxy (N-MADP) device to:
send an instruction to instruct a first access network to transmit, over a forward link of the first access network, a first probe request (Probe-REQ) message that includes a reverse connection identifier (R-CID) field to indicate the first access network as a network over which to receive a first probe acknowledge (Probe-ACK) message;
identify the first Probe-ACK message received over a reverse link of the first access network;
determine a round-trip time (RTT) measurement for the first access network based on receipt of the first Probe-ACK message;
send an instruction to instruct a second access network to transmit, over a forward link of the second access network, a second Probe-REQ message including a second R-CID field to indicate the first access network as a network over which to receive a second Probe-REQ message;
identify a second Probe-ACK message received over the reverse link of the first access network;
determine a RTT measurement for the second access network based on receipt of the second Probe-ACK message; and
measure one-way delay (OWD) between the forward link of the first access network and the forward link of the second access network based on the RTT measurement for the first access network and the RTT measurement for the second access network.

12. The one or more computer-readable media of claim 11, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

13. The one or more computer-readable media of claim 11, wherein the forward link is a downlink (DL) and the reverse link is an uplink (UL).

14. The one or more computer-readable media of claim 11, wherein the forward link is a UL and the reverse link is a DL.

15. The one or more computer-readable media of claim 11, wherein the first access network is a Wi-Fi network and the second access network is a long-term evolution (LTE) network.

16. The one or more computer-readable media of claim 11, wherein the first access network is an LTE network and the second access network is a Wi-Fi network.

17. An apparatus of a user equipment (UE), the apparatus comprising:
communication circuitry to:
receive, over a first link of a first access network, a first probe request (Probe-REQ) message that includes a reverse connection identifier (R-CID) field to indicate the first access network as a network over which to receive a probe acknowledge (Probe-ACK) message; and
receive, over a first link of a second access network, a second Probe-REQ message including a second R-CID field to indicate the first access network as a network over which to receive the Probe-ACK message; and processor circuitry communicatively coupled to the communication circuitry to:

generate a one-way delay (OWD) measurement between the first link of the first access network and the first link of the second access network; and send an instruction to cause a first access technology to transmit the Probe-ACK message over a second link of the first access network, or the instruction to cause a second access technology to transmit the Probe-ACK message over a second link of the second access network, wherein the Probe-ACK message includes the one-way delay (OWD) measurement between the first link of the first access network and the first link of the second access network.

18. The apparatus of claim 17, wherein the first Probe-REQ message and the second Probe-REQ message each include a probing flag field to indicate that the OWD is to be measured.

19. The apparatus of claim 17, wherein the first Probe-REQ message and the second Probe-REQ message each include a probing flag field to indicate that the Probe-ACK message is to include the OWD measurement.

20. One or more non-transitory computer-readable media storing instructions, that, when executed by one or more processors, cause a Network Multi-Access Data Proxy (N-MADP) device to:

transmit, over a first link of a first access network, a probe request (Probe-REQ) message that includes a reverse connection identifier (R-CID) field to indicate the first access network as a network over which to receive a probe acknowledge (Probe-ACK) message;

identify a first Probe-ACK message received over a second link of the first access network;

identify a second Probe-ACK message received over a second link of a second access network;

measure one-way delay (OWD) between the second link of the first access network and the second link of the second access network based on the first Probe-ACK message and the second Probe-ACK message.

21. The one or more computer-readable media of claim 20, wherein the Probe-REQ message includes a probing flag field to indicate that the first Probe-ACK message and the second Probe-ACK message are to be transmitted simultaneously.

22. The one or more computer-readable media of claim 20, wherein the N-MADP is to be implemented using: an evolved Node-B (eNB), a next-generation Node-B (gNB), a next-generation Node-B central unit (gNB-CU), a serving gateway (Serving GW), a packet data network gateway (PDN GW), a user plane function (UPF) element, or a multi-access edge computing (MEC) element.

23. The one or more computer-readable media of claim 20, wherein to measure the OWD between the second link of the first access network and the second link of the second access network, execution of the instructions is to cause the N-MADP device to:

determine a round-trip time (RTT) measurement for the first access network based on receipt of the first Probe-ACK message;

determine a round-trip time (RTT) measurement for the second access network based on receipt of the second Probe-ACK message;

determine the one-way delay (OWD) between the second link of the first access network and the second link of the second access network based on a difference between the RTT measurement for the first access network and the RTT measurement for the second access network.

* * * * *

UNITED STATES PATENT AND TRADEMARK OFFICE
CERTIFICATE OF CORRECTION

PATENT NO. : 11,206,690 B2  
APPLICATION NO. : 16/610875  
DATED : December 21, 2021  
INVENTOR(S) : Jing Zhu et al.

Page 1 of 1

It is certified that error appears in the above-identified patent and that said Letters Patent is hereby corrected as shown below:

In the Claims

Column 53  
Lines 44, "a..." should read – "the..."  
Lines 47-48, "...one-way delay (OWD)..." should read – "...OWD..."

Column 54  
Line 25, "...as a..." should read – "...as the..."

Column 56  
Line 27, "...a round-trip time (RTT)..." should read – "...an RTT..."  
Line 30, "...one-way delay (OWD)..." should read – "...OWD..."

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*